Sept. 9, 1958  J. W. PAYNE  2,851,401
METHOD FOR FEEDING GRANULAR SOLID MATERIAL
Filed Nov. 6, 1953  9 Sheets-Sheet 3
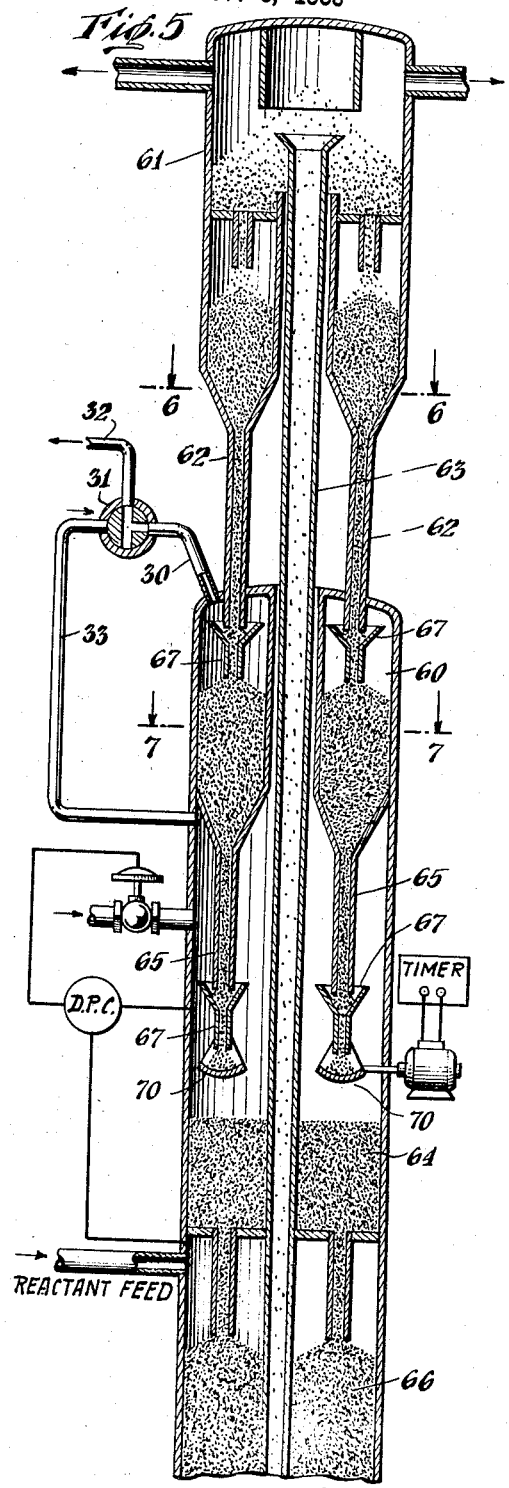
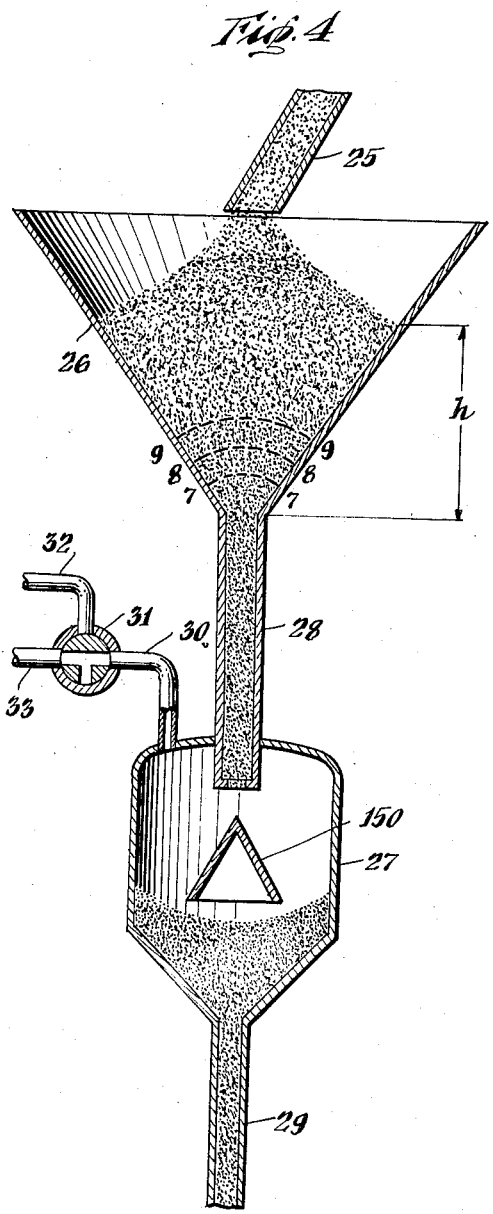
INVENTOR.
John W. Payne
BY
Charles A. Huggett
ATTORNEY

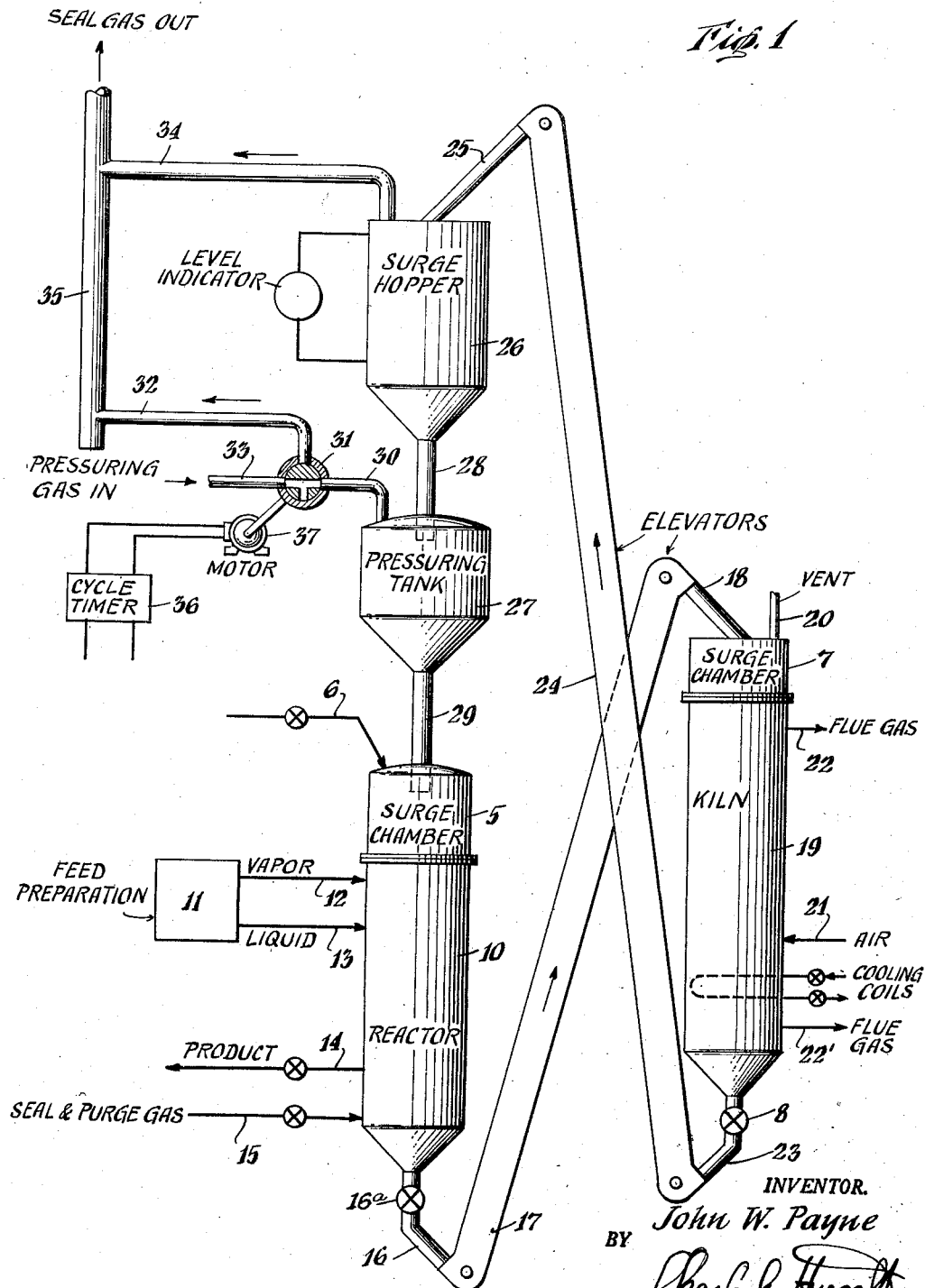

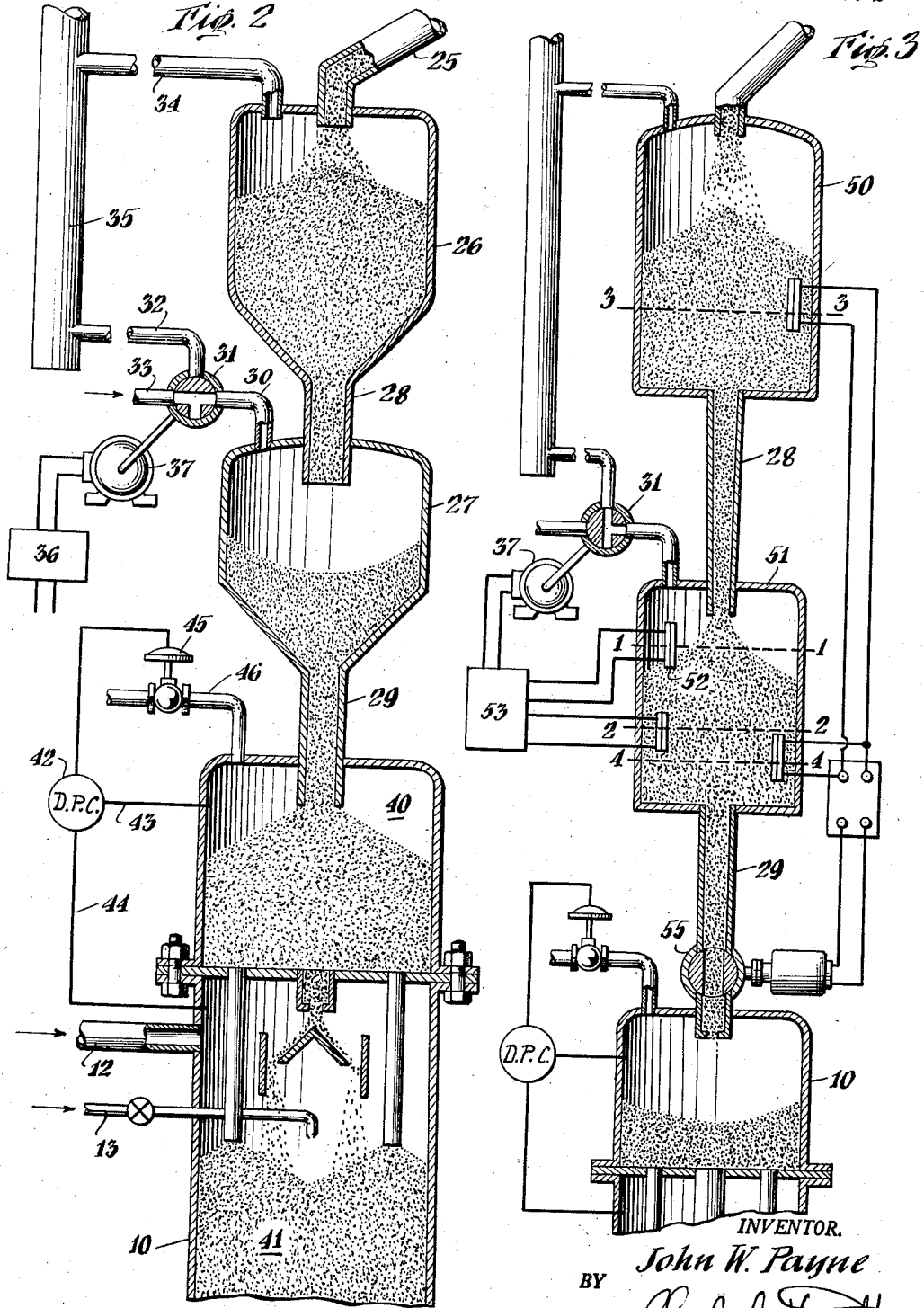

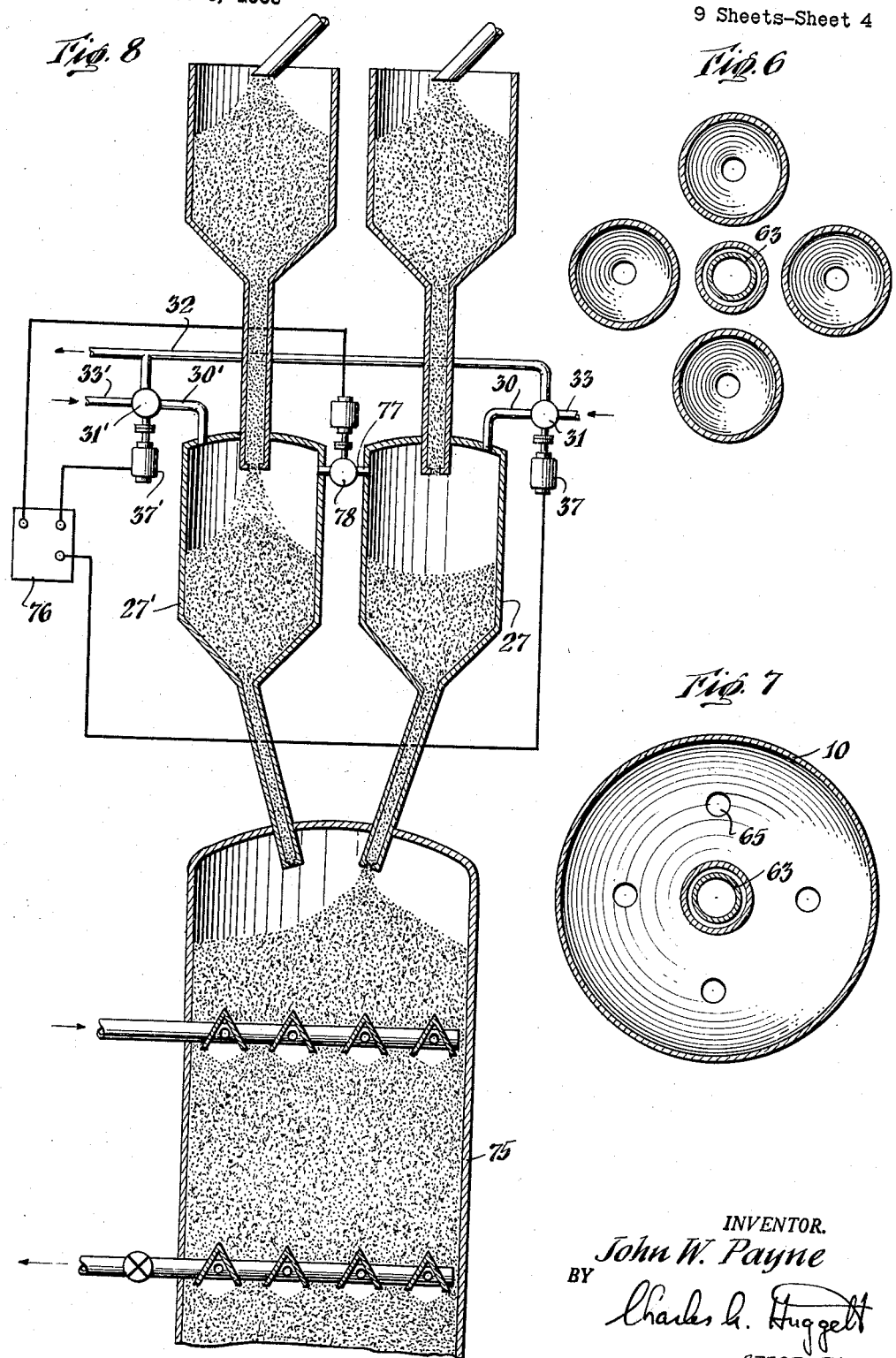

Sept. 9, 1958 J. W. PAYNE 2,851,401
METHOD FOR FEEDING GRANULAR SOLID MATERIAL
Filed Nov. 6, 1953 9 Sheets-Sheet 5
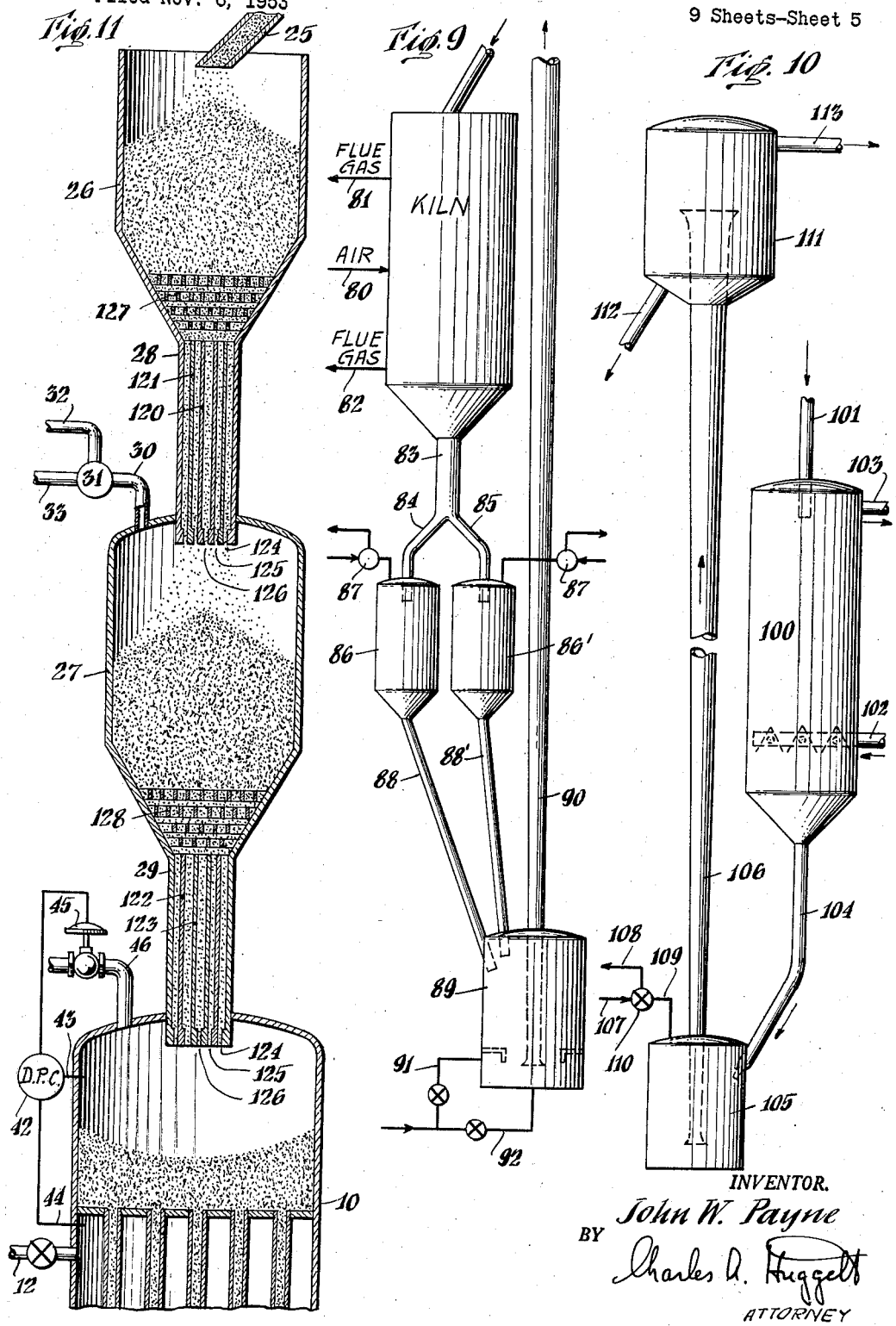
INVENTOR.
John W. Payne
BY
Charles A. Huggett
ATTORNEY

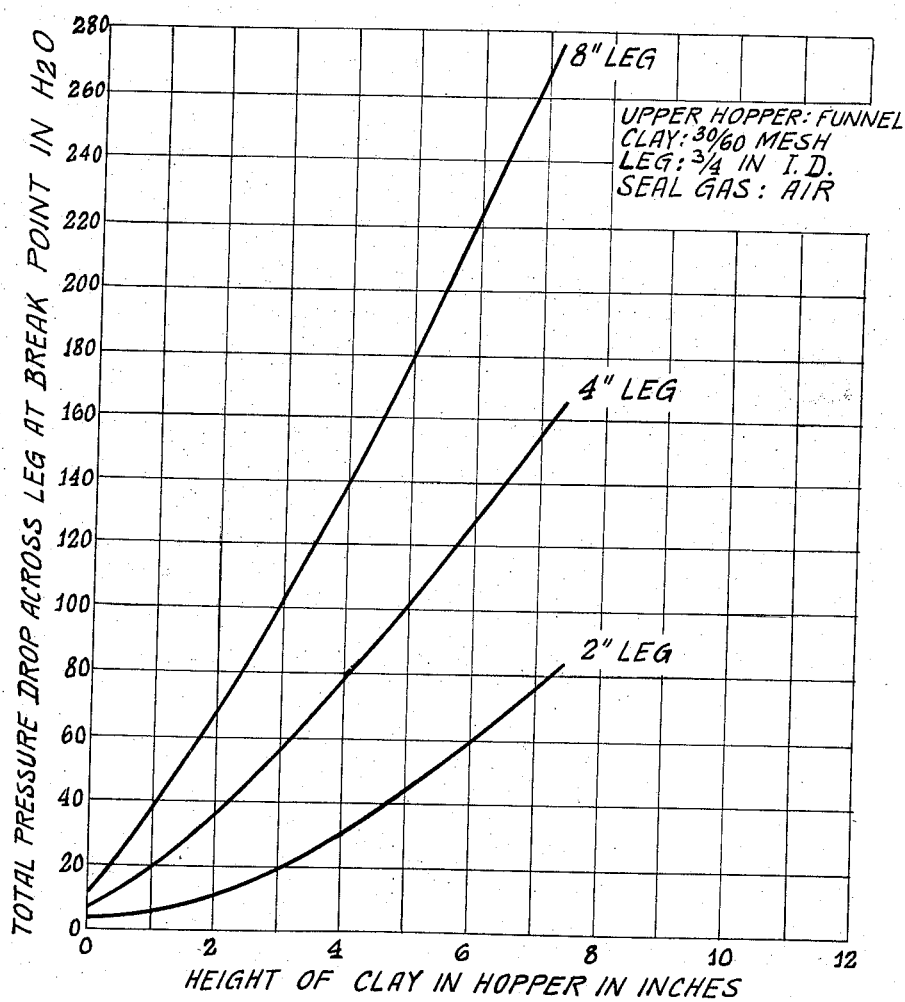

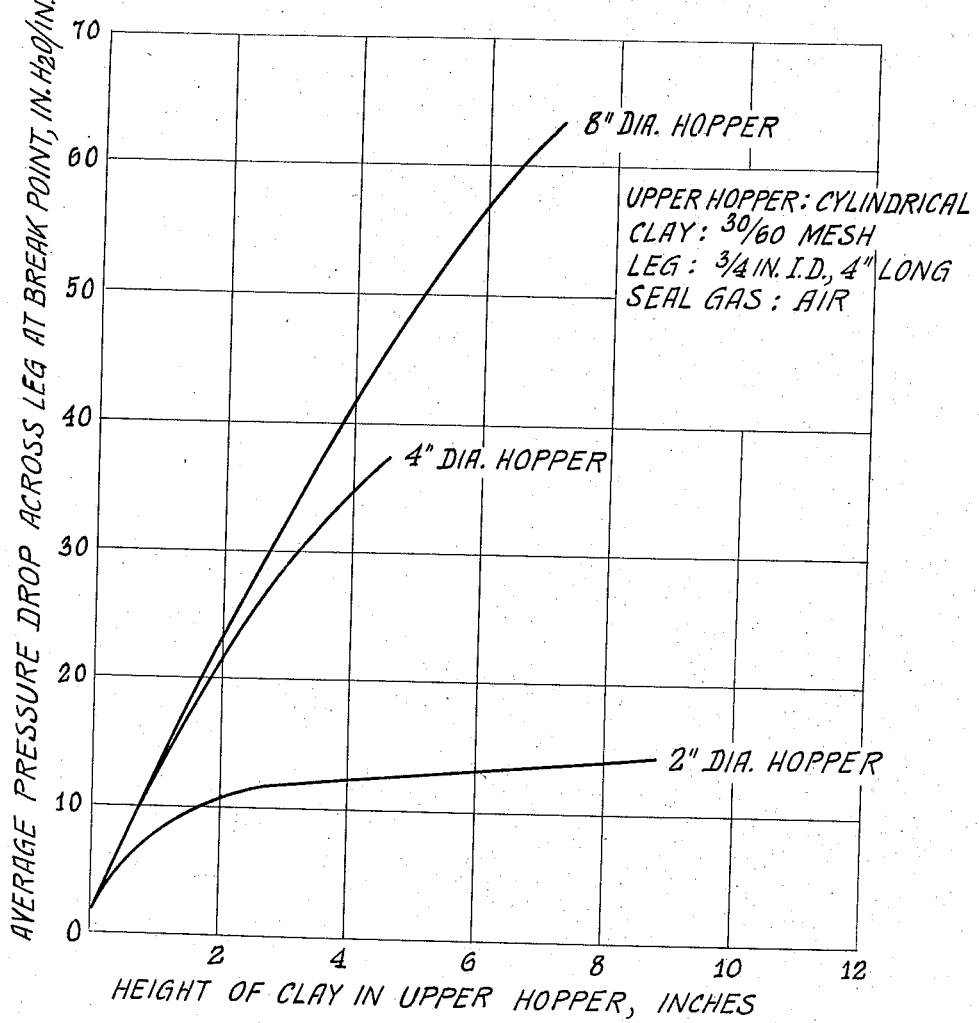

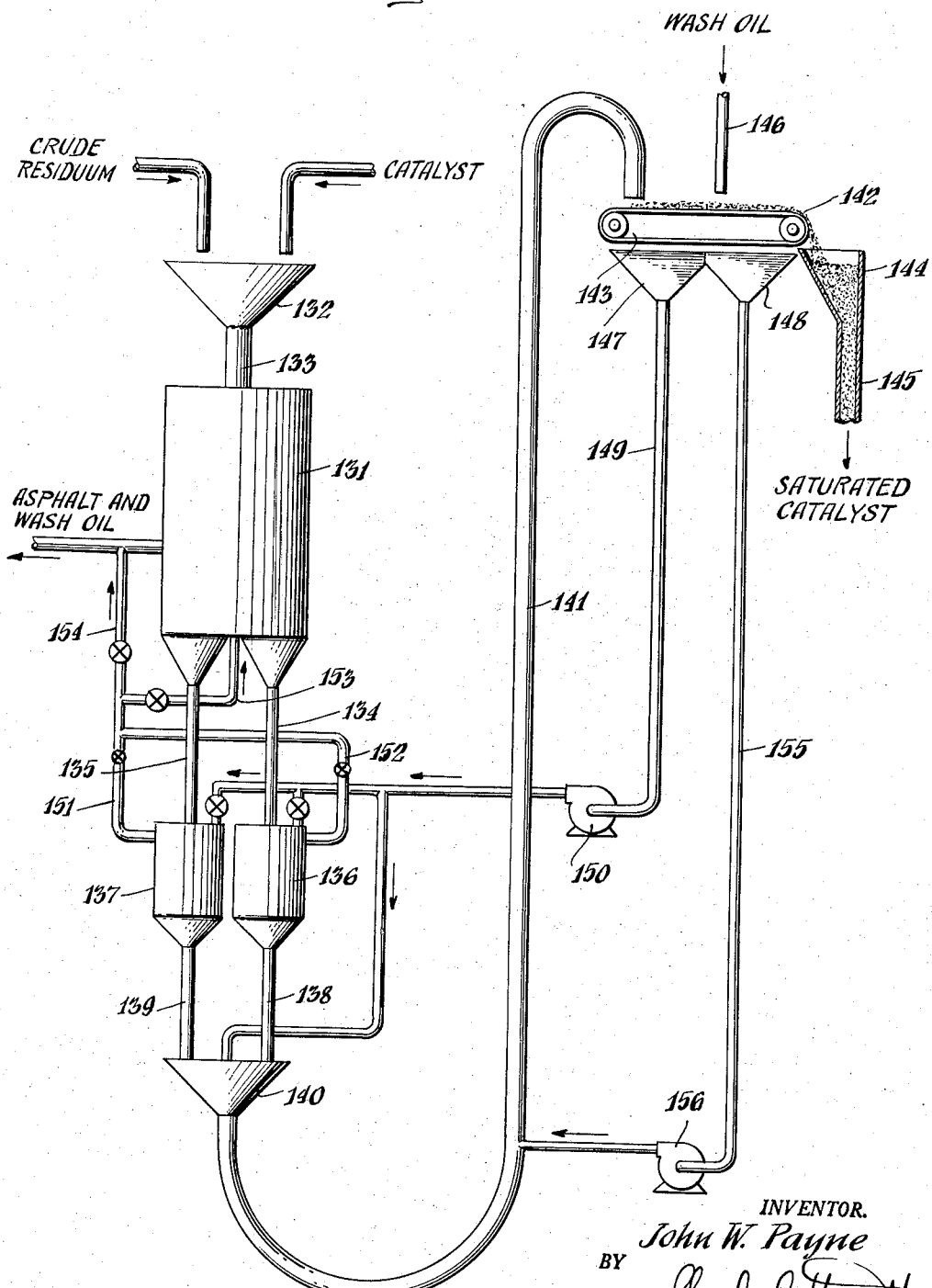

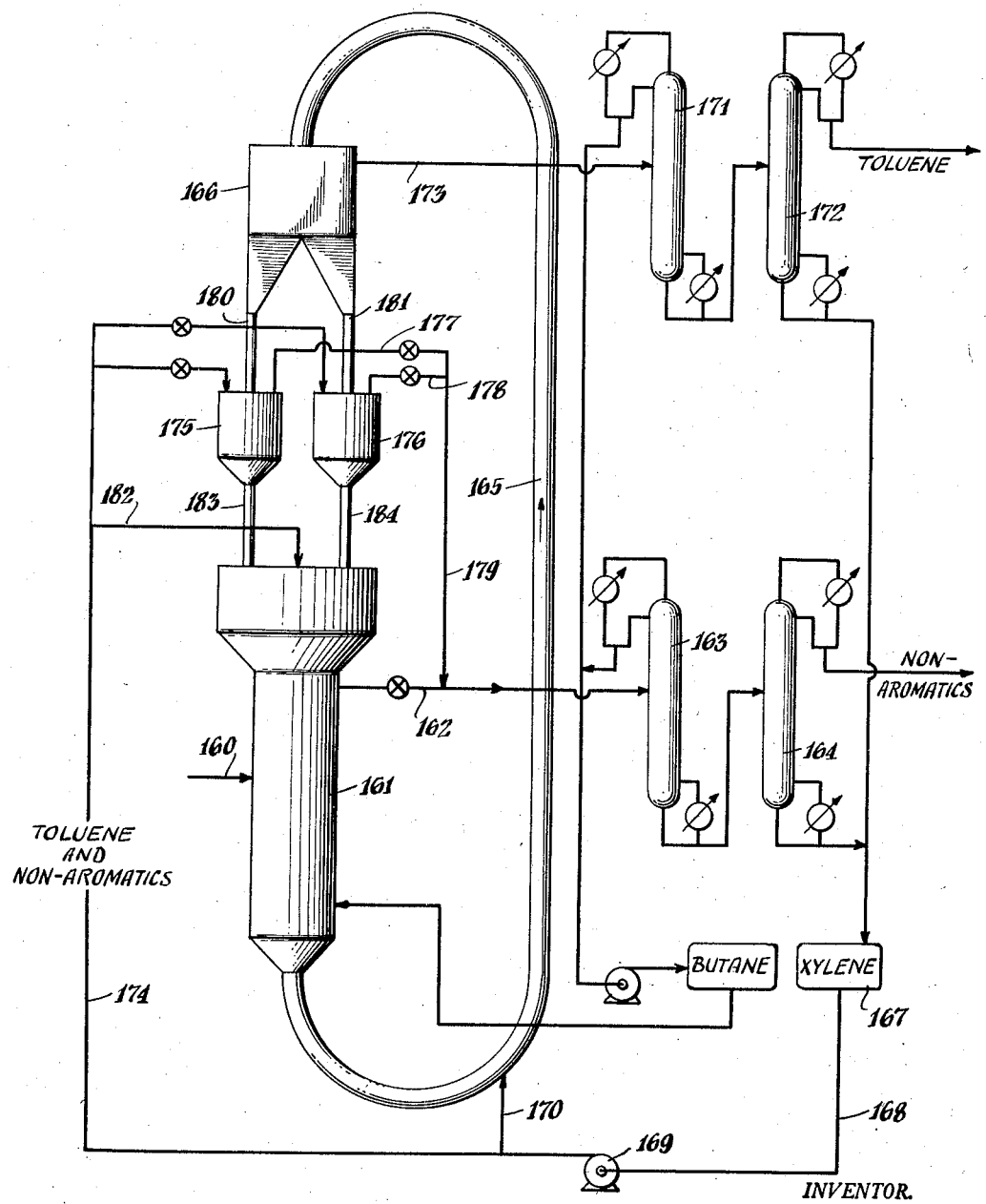

United States Patent Office 2,851,401
Patented Sept. 9, 1958

2,851,401
METHOD FOR FEEDING GRANULAR SOLID MATERIAL

John W. Payne, Woodbury, N. J., assignor to Socony Mobil Oil Company, Inc., a corporation of New York Application November 6, 1953, Serial No. 390,468

13 Claims. (Cl. 196—52)

This invention pertains to the feeding of solid particles from a low pressure region to a region of substantially higher pressure. It more particularly relates to the introduction of granular catalyst or contact material into a gas contacting zone maintained at advanced pressure, such as a reaction zone, from a storage zone maintained at a lower pressure located above the contacting zone. In less restricted form, however, the invention relates to the transfer of solid granular material downwardly to an enclosed region and transfer from said region to a zone maintained under high gaseous pressure.

The invention is particularly suited for use in moving bed systems of the general type in which reaction and regeneration are accomplished simultaneously in separate confined zones through which the catalyst or contact material is passed as a relatively compact bed of solid particles. The fluid reactants are passed through the bed of solid particles in the reaction zone continuously and the regenerating fluid is passed through the bed of solids in the regeneration zone. The particles are transferred continuously from the bottom of one zone to the top of the alternate zone to complete an enclosed cyclic path. The particles may be elevated between the zones by means of mechanical elevators of the continuous bucket or Redler type, fluid lifts wherein the particles are propelled upwardly through a lift passage in a stream of rapidly-moving lift gas or gas pressure lifts wherein the granular material is moved upwardly through an upwardly-directed pipe as a continuous confined column by means of the gas pressure differential across the pipe. The invention is also applicable to boiling bed processes wherein gas is flowed upwardly through the particles in the contacting zones at velocities high enough to disrupt or boil the bed of particles, provided the particles are large enough to flow as compacted columns through drain legs of restricted cross-section. For example, the particles may be in the size range of about 30–60 mesh Tyler must not be of a size smaller than 100 mesh Tyler, commonly referred to as powder. Various processes to which this invention can be applied include reforming, hydroforming, cracking, isomerization, alkylation, isoforming, aromatization, dehydrogenation, hydrogenation, cyclyzing, dehydrocyclizing, treating, polymerization, the conversion of propane to acetylene, coking and visbreaking.

Realizing that the invention has broad application to many processes, such as those listed above, as well as to other gas-solids contacting operations, for convenience, it will be described with reference to the catalytic cracking of hydrocarbons to produce lighter material boiling in the gasoline boiling range. In this process, the catalyst is gravitated as a substantially compact bed through the reaction zone. The zone is maintained at about 800–1000° F. and at an advanced pressure of about 5–60 p. s. i. (gauge). The reactants, usually preheated to about 700–800° F., are introduced into the reaction zone as a vapor, liquid or mixture of both. The hydrocarbons pass through the voids in the bed and are withdrawn as converted products after passage through the proper depth of catalyst bed. The flow of reactants may be concurrent, countercurrent, split flow or even cross-flow with respect to the flow of the catalyst. The catalyst is removed continuously and transferred to the top of a gravitating bed of the solid material in the regenerating zone. A gas, usually air, is introduced into the bed of solids in the regeneration zone to burn the carbonaceous material from the surface of the contact material. The flue gas is removed continuously from the zone after passage through the required depth of catalyst bed. The pressure is generally maintained at substantially atmospheric pressure, although in some instances, it is desirable to maintain this zone at other pressures. It may even be desirable, in some cases, to maintain the regeneration zone at a pressure greater than that in the reaction zone. The temperature in the regenerating zone is usually maintained at about 1000–1300° F. When inerts are used, such as mullite, Carborundum, coke or fused alumina, the temperature may be substantially in excess of 1300° F., but for catalytic cracking, this upper limit must not be exceeded or the catalyst material will be heat damaged and rendered unfit for reuse. The heat damaging temperature varies to some extent with the type of catalyst material being used. For example, the limit for natural or treated clay catalyst is about 1200° F., whereas the limit for silica-alumina gel type catalyst is about 1400° F.

The regenerated catalyst is withdrawn from the bottom of the regenerating zone and transferred to the top of the reaction zone. The problem of introducing the catalyst into the reaction zone against the advanced pressure maintained in that zone has troubled industry since the origin of the moving bed hydrocarbon conversion process. Star valves and gas type mechanical measuring devices as well as positive feeding valves, screw conveyors, catalyst pumps, pressure lock systems with gas type valves in catalyst lines before and after pressuring chambers, have all been suggested heretofore in the prior art as means for feeding catalyst from a low-pressure zone into a higher pressure zone therebelow. These valves and devices all cause high catalyst attrition losses and are themselves subjected to severe wear and rapid failure at the high temperature conditions involved. The problem of maintaining proper lubrication in the moving parts of such mechanical feed means is a serious one and the failure of proper lubrication results in the failure of the mechanical feed device. Such mechanical feed devices at best require constant attention from the operator and have always been found eventually to fail with resultant disruption in the operation of the conversion system.

Another means suggested by the prior art for feeding catalyst into pressure reacting zone is the gravity feed leg described and claimed in U. S. Patents 2,410,309 and 2,531,365. This comprises an elongated substantially compact column of catalyst in an upwardly-directed passage above the reaction zone in open communication with the pressured reaction zone. The calculated head or weight of catalyst in the column per unit of cross-sectional area is sufficient to permit the catalyst to feed into the reaction zone smoothly against the advanced pressure without restrictions in the passage. There is no head developed in a catalyst column maintained in compacted form in the manner that a fluid head is developed at the base of a pipe full of fluids. However, it has been found that when the value obtained by dividing the weight of catalyst in the column by the cross-section of the base of the column is above a critical limit, the solids will flow downwardly in compact columnar form into the advanced pressure zone and when the value is below the critical level, the solids will not flow. It is convenient, therefore, to refer to the so-called calculated head of catalyst in the feed leg. The column is made as small as possible in cross-section, consisting with the catalyst flow requirements of the reaction zone, to prevent the escape of reactants from the reaction zone. The top of the column is continuously replenished with catalyst from a storage zone. These feed legs are a very substantial improvement over the mechanical feeding devices, as is evidenced by their exclusive use in commercial moving bed catalyst systems. However, gravity feed legs of the compact flowing catalyst type require the provision of roughly 4–5 feet of leg height per pound of pressure differential across the leg. As a result of obvious practical considerations, such legs have not been recommended in systems requiring feeding against gaseous pressure differentials in excess of about 30 p. s. i. and have not been used commercially for feeding against pressures in excess of about 15 p. s. i. (gauge). Even in the present day commercial catalytic cracking units, these legs are about 80–100 feet tall and require extensive structural steel to support them and surge hoppers above them at heights up to twice the height which would otherwise be required for the entire catalytic conversion system. As an example of the uselessness of such legs for high pressure operations, such as are encountered in catalytic reforming, it would require a leg about 700–900 feet tall to feed against the desirable operating pressure of about 175 p. s. i. The industry has searched for many years, in fact, from the inception of the moving catalyst type conversion systems, for a practical commercial means for feeding catalyst against pressure without requiring moving mechanical valves in catalyst lines or the use of feed legs of undesirable height. Up to the present time, no such means has been proposed. In addition to this, since the inception of compact moving bed systems of the T. C. C. type, industry has continuously searched for a more practical means for feeding catalyst to present day T. C. C. reactors than the gravity feed legs. It has long been desired to reduce the over-all heights of conversion systems which operate under relatively low pressure such as 10–15 p. s. i. (gauge). Up to now, no one has been able to provide a practical answer. The present invention constitutes the first practical answer to these problems.

The object of this invention is to feed a palpable particulate solid material from a zone at one gaseous pressure to a second zone at another and higher gaseous pressure.

A further object of this invention is to provide an improved method for feeding a granular solid material from a low-pressure region to a high-pressure region located therebelow through a passage in continuous open communication with both regions.

It is a further object of this invention to provide an improved method for transferring solids from a supply zone under one gaseous pressure into a gas contacting zone located therebelow maintained under an advanced gaseous pressure through a connecting passage in open communication with both zones.

It is a further object of this invention to provide an improved method for feeding a granular contact material into the top of an advanced pressure reaction zone of a moving bed conversion system.

It is a further object of this invention to provide in a moving bed hydrocarbon conversion system in which a granular contact material is gravitated as a compact bed through a reaction zone at high pressure and reactivating zone at low pressure an improved method for introducing the granular material withdrawn from the low pressure reactivating or regeneration zone into the high-pressure reaction or conversion zone.

These and other objects of the invention will be made more apparent in the detailed discussion of the invention which follows.

In simple form, the invention comprises gravitating solid granular material from a low pressure supply zone downwardly through a short passage of restricted cross-section into a pressuring zone of enlarged cross-section while the pressure in the pressuring zone is substantially that of the low pressure supply zone. At intervals pressure is built up in the pressuring zone until it is substantially equal to or slightly greater than the pressure in the receiving zone, which may be the high pressure reaction zone or gas-solids contacting zone. The granular material then is transferred or gravitated through a short passage of restricted cross-section from the pressuring zone into the high-pressure zone. While the pressuring zone is under pressure, the short passage above this zone remains full of granular material in static compact form, serving as a seal for the pressuring zone. This is accomplished by expanding the cross-section of the column of granular material at the upper end of the short passage or within the supply zone so that the upward gas velocity at some level in the column at the upper end of the passage or within the supply zone is below the linear gas velocity required to boil the granular material, i. e., to disrupt its compacted state. The short passage has a pressure drop thereacross which is greater than the calculated head of catalyst in the leg. Disruption of the column of catalyst is prevented because there is provided and maintained at all times a bed of catalyst above the level where the upward gas velocity falls below the boiling velocity which is sufficient to overcome the upward forces at that level and maintain the catalyst in the leg in compacted form. In order to insure the short passage running full of granular material, a restriction may be provided at or adjacent the lower end thereof, so that when flow occurs through this passage, it is not of the "free-fall" type, but rather as a compact gravitating stream of granular solid material. After the level of solids in the pressuring zone has dropped to a certain level, the pressure is released therein and the pressuring zone again fills with solid material from the low-pressure supply zone. Meantime, the short passage from the pressuring zone to the high pressure receiving zone acts as a seal in a manner similar to that described for the short passage between the low-pressure supply zone and the pressuring zone. In a broader aspect of the invention, the method and means of removing the solid material from the pressuring zone during the pressuring period of the cycle is not limited to gravity flow from the zone through a short pipe or passage. Any convenient mode of removal of solid material from an enclosed vessel or zone may be used.

The invention will be disclosed hereinafter in more detail with reference to the attached sketches. Similar parts in the various figures will be given the same reference numbers for simplicity. These figures are all highly diagrammatic in form and are provided only to facilitate description of the invention.

Figure 1 shows a complete hydrocarbon conversion system with side-by-side arrangement of the reactor and kiln and bucket elevators for raising the catalyst.

Figure 2 shows in vertical section an arrangement of vessels and conduits above the reactor in which the invention can be practiced.

Figure 3 shows alternate apparatus for feeding the contact material into the high pressure reactor.

Figure 4 shows in vertical section a preferred apparatus combination for feeding granular solid material from a region at low pressure to a region at high pressure.

Figure 5 shows in vertical section a modified arrangement of apparatus illustrating the invention which includes a pneumatic lift type system.

Figure 6 shows a horizontal cross-sectional view as seen on plane 6—6 of Figure 5.

Figure 7 shows a horizontal cross-sectional view as seen on plane 7—7 of Figure 5.

Figure 8 illustrates an apparatus combination involving two or more complete systems for feeding solid material to the high pressure vessel.

Figure 9 shows the invention applied to feeding granular material from the bottom of a low pressure reactor or kiln into a lift feed vessel operated under a substantially higher pressure.

Figure 10 shows a system for feeding solid material from a low pressure vessel or from a vessel operating under high pressure into a lift pressuring drum which may attain a still higher pressure during a portion of the operating time.

Figure 11 shows in vertical cross-section a still further improved apparatus for feeding granular material downwardly from a low pressure vessel to a high pressure vessel.

Figure 12 is a graph of the maximum total pressure drop across the improved seal leg of this invention for various lengths of seal leg versus the depth of the solid material bed maintained above the seal leg.

Figure 13 is a graph of the maximum pressure drop per unit of seal leg length versus the depth of the solid material bed maintained above the seal leg for various bed diameters.

Figure 14 shows an application of the invention to a system for deasphalting crude residuum with absorbing solids.

Figure 15 shows an application of the invention in a continuous adsorption process for the separation of aromatics from non-aromatics.

Referring to Figure 1, the invention is applied to a typical moving bed system, such as a catalytic hydrocarbon conversion system for cracking heavy hydrocarbons to produce light material boiling in the gasoline boiling range. The palpable particulate material is gravitated through the vessel or reactor 10 as a continuous column in which the particles remain in contiguous contact throughout their travel through the vessel. A surge chamber 5 may be provided in the upper portion of the vessel by means of a horizontal partition and depending pipe baffle arrangement, common in the hydrocarbon conversion art. An inert gas may be introduced into the surge chamber 5 through the conduit 6 at a pressure slightly higher than the pressure in the reaction zone. Hydrocarbons may be prepared for cracking in suitable feed preparation apparatus, illustrated by block 11 and transferred by the pipes 12, 13 as vapor and liquid material to the column of solid material in the reactor 10. The hydrocarbons travel downwardly through the voids in the catalyst bed and the converted products are withdrawn from the lower portion of the reactor through the conduit 14 to further processing apparatus, not shown. The catalyst bed may be maintained at a temperature of about 800–1000° F. and under a gaseous pressure of about 5–60 p. s. i. (gauge). A seal and purge gas, such as steam or flue gas, may be introduced through the conduit 15 into the lower portion of the reactor 10 to strip the solids of vaporizable hydrocarbons and remove them through the conduit 14. The stripped solid material is withdrawn from the bottom of the reactor through the conduit 16 and flows by gravity to the bottom of the elevator 17. The valve 16a may be used to control the downward flow rate of the granular material in the reactor and maintain the granular particles in compacted form throughout the reaction zone. The particles are discharged from the top of the elevator 17 into a descending conduit 18.

The particles flow by gravity through the conduit 18 into the top of the vessel or kiln 19. The upper portion of the kiln or burner 19 may have a surge zone 7 formed by a horizontal partition and suitable depending pipes for transferring the solids from the surge region downwardly into the burning section of the kiln. The kiln 19 may be vented to the atmosphere by means of the vent pipe 20 located atop the vessel in communication with the surge region 7. Air is usually introduced into the lower portion of the kiln through the conduit 21 to travel upwardly and downwardly through the voids in the continuous gravitating column of solids and burn carbonaceous material from the contacting surface of the catalyst. The carbonaceous material, usually termed "coke," is formed during conversion on the exterior surface of the solids and within the pores of the adsorptive solid material. The burning effects at least partial removal of the coke with the resultant formation of a flue gas. The burning is usually effected under substantially atmospheric pressure and at temperatures of about 1000–1300° F. The flue gas is removed from the vessel 19 through the conduit 22 and 22' in the upper and lower portions of the vessel. The regenerated solids are withdrawn from the bottom of the burner 19 through the conduit 23. The flow rate of the solids through the burning zone is controlled by the valve 8 to maintain the particles in the form of a continuous column. The particles are lifted through the bucket elevator 24 and transferred by gravity through the short conduit 25 onto the top of a pile of solids in the surge hopper 26.

The surge hopper 26 is located a short distance above the reactor 10. A pressuring tank 27 is located between the hopper 26 and the reactor 10. A first short vertical conduit 28 is connected between the surge hopper and the pressuring tank 27 and a second short vertical conduit 29 is connected between the pressuring tank and the top of the reactor 10. A gas conduit 30 is attached to the top of the pressuring tank 27. The three-way valve 31 is adjusted to connect the conduit 30 with the conduit 32, permitting the pressure in the tank 27 to fall to atmospheric. Granular material gravitates through the conduit 28 to fill the tank. The three-way valve 31 is then adjusted to connect the conduit 30 with the conduit 33, permitting gas under pressure to be admitted to the tank 27 to raise the pressure in the tank to a pressure near that in the reactor. This permits the catalyst to feed downwardly from the pressuring tank by gravity into the reactor while preventing the flow of solids through the conduit 28. Although the pressure in the tank may be high enough to blow solids upwardly through the conduit 28 this is prevented by this invention by a method disclosed in more detail hereinafter. The three-way valve is continually changed from one position to the other periodically to prevent the pressuring tank from emptying of solid material and permit a fresh supply of solids to transfer from the hopper 26 to the tank 27. When the pressure in the tank 27 is high, gas escapes upwardly through the passage 28 and discharges from the top of the hopper 26 through the conduit 34. When the pressure in the tank is reduced, the gas escapes through conduits 30 and 32. Both conduits 32 and 34 are connected into a stack 35, which may be vented to the atmosphere. The opening and closing of the three-way valve is preferably controlled by a cycle timer 36 which operates a motor 37 connected to the valve 31.

Referring to Figure 2, it will be noted that the surge hopper 26 and pressure hopper 27 have a gradually tapered bottom so that the catalyst column beginning at the base of each short connecting conduit 28, 29 is expanded at its upper end until an area is reached where the amount of gas which will normally escape upwardly through the connecting leg would not be sufficient to cause boiling of the contact material in the expanded bed. It is important to note that in any system wherein there is provided a seal leg of compacted granular material in open communication with two zones at different pressure, a certain amount of gas will be forced by the pressure differential to pass upwardly through the interstices between the solid particles so as to escape from the upper end of the seal leg. This escape of gas can only be prevented by the provision of a very high and narrow feed leg through which the solid material is flowing downwardly at a relatively high velocity. In those cases, the amount of gas carried down in the voids of the moving stream of particles may exceed the amount of gas passing upwardly through the lower section of the seal leg, as described in more detail in U. S. Patent No. 2,531,365. However, in systems of the type herein involved where it is desired to save height by employing relatively short seal legs as compared to what was known to the prior art, the conditions are such that a certain amount of gas will pass upwardly through the short legs to the hopper thereabove. The resistance to this gas flow is almost exclusively the resistance offered through the narrow portion of the seal leg, such as the column in the conduit 29 when the pressure in vessel 27 is low or the column in the conduit 28 when the pressure in the vessel 27 is high. That is the portion of the column up to the conical base of the hopper thereabove. While the catalyst bed above this column does offer a slight resistance to gas flow, such resistance is negligible compared to that offered under the relatively narrow seal legs in the conduits 28 or 29.

Referring to Figure 4, along with Figure 2, it should be noted that with increasing pressure differential across the short seal leg an increasing amount of vapor will escape upwardly from the pressuring hopper to the surge or feed hopper thereabove. The velocity front of the gas flow in the surge hopper will be approximately along the lines 7—7 for some given pressure differential, for example, assuming that line 7—7 represents the line at which the velocity of the gas has decreased to that velocity which would just boil the catalyst in the absence of the bed above that level (the critical level). At some higher pressure differential, other things being the same, the same condition would be reached at a higher level in the hopper such as shown on line 8—8 or line 9—9. Similar velocity fronts will be obtained in a flat bottom hopper, such as is shown in Figure 3, and illustrated by lines 2—2 and 4—4. In general, these fronts are spherical. At this bed level in the surge hopper for any given pressure differential, the critical level, the catalyst would boil at the bed surface if there were no additional bed of greater effective cross-sectional area thereabove, because of the upward push of the catalyst below. As a result, the seal leg would blow out entirely and the seal be lost. The components of force at the level at which the linear velocity of the gas would be just sufficient to boil the catalyst are due mainly to the upward push from the catalyst particles just below this level. This upward push is not very great because the walls of the seal leg and the walls of the hopper absorb most of the upward push at all levels except those a very short distance below the critical level in question. So only a bed of relatively low height is required above this critical level, but this bed must be provided or the leg will be lost. This bed must have two characteristics:

(1) It must have a height which is sufficient to overcome the upward force at the critical level (i. e. that level at which the gas velocity has been reduced to a velocity just sufficient to boil the catalyst) and (2) It must be at least greater and preferably of substantially larger horizontal cross-sectional dimension, than the bed at the critical level. Thus, if the pressure differential across the seal leg becomes so great that the level where the gas velocity is just exactly the minimum required to boil or disrupt the compact catalyst at the bed surface reaches a level in the feed hopper which corresponds to the level of maximum effective horizontal cross-sectional dimension in the feed hopper, then the catalyst leg will blow out even though there may be a very substantial bed of catalyst in the portion of the hopper thereabove. This is to say that in Figure 2 at a level above the conical portion of the surge hopper if the gas velocity across the bed is as great as that which would boil the catalyst irrespective of bed height, then the catalyst bed will boil and the leg will be lost even though a very substantial height of bed is maintained above that level.

Usually the ratio of $$\frac{\text{Diameter of feed tank}}{\text{Diameter of seal pipe}} =$$

broadly within the range about 3–10, where the pressure differential across the seal leg is within the range about 1–15 p. s. i. per foot. For operations where the pressure drop is of the order of 1¾ p. s. i. per foot of seal leg height, the above ratio should preferably be from about 4–6. Where the pressure drop per foot is higher, for example, of the order of 2½ p. s. i. and broadly in the range about 2½–5 p. s. i. per foot of seal leg height, the ratio of diameters should be not less than about 6. The minimum required bed height above the critical level depends, of course, on the relative cross-section of the bed above and below the critical level and on the catalyst density. Also, the minimum bed required increases substantially in direct proportion to the total pressure drop across the seal leg and bed thereabove. Also, it is influenced by the hydraulic radius of the seal leg and of the feed hopper at bed levels both above and below the critical level in the bed, other things such as ratio of hopper to seal leg diameter being constant. In general, a decrease in hydraulic radius in the seal leg or in the feed hopper by use of vertical partitions in the former and grating or baffles in the latter greatly reduces the minimum bed height required above the critical level. But in any event, the minimum bed above the critical is usually above 2 inches and more often above 6 inches. The hydraulic radius is the cross-sectional area divided by the wetted perimeter.

Since it is important in this invention, for the reasons above discussed and also because of the practical desire to maintain loss of seal gas at a minimum, to maintain the catalyst in the seal legs in compact form, it becomes important to provide near or adjacent the lower end of the narrow portion of the seal leg some means for restricting catalyst flow below the capacity of the portion of the seal leg thereabove. This means will prevent free-flow of catalyst through the seal leg which would occur in the absence of such restriction. It will become apparent that if there were free-flow conditions in the seal leg, the catalyst particles in the lower end thereof would not be compacted but would be spread out so that when pressure was applied to the pressuring hopper, it would be difficult to stop the movement of the catalyst so as to provide a continuous compact static leg of catalyst. The use of restrictions to prevent free-flow of catalyst through a pipe are discussed at some length in U. S. Patent No. 2,423,411. As an alternative, the seal leg may be tapered as shown in Figure 3. The seal leg is tapered outwardly from bottom to top so that the gas passing upwardly through the leg 28 of Figure 3 expands laterally. Tapering not only prevents free-fall of catalyst in the pipe but tends to promote a uniform pressure drop along the pipe. The pipe should have a substantial taper, such as 70 degrees with the horizontal to insure that the material is maintained in compacted form throughout the entire length. As a further alternative, the seal leg may be allowed to run free until the bed level in the pressuring zone rises to the bottom of the leg thereby allowing the leg to be filled with contact material. The pressuring vessel is then put under advanced pressure. It is noted in Figure 4 that a conical baffle 150 is located in the hopper 27 with the apex of the cone just below the seal leg 28. When flow of catalyst from the leg 28 is started, the catalyst must drop to the bed level in the hopper 27. It has been found that fracture of the catalyst occurs in some instances even for short drops and, therefore, the cone baffle 150 is inserted to limit the free-fall of catalyst to a minimum. In the operation shown in Figure 2, when the pressuring hopper 27 becomes full of catalyst, the pressure therein is increased to a level near that in the surge hopper or surge zone 40 in the upper portion of the reactor 10.

This pressure may be below that in the surge zone 40, equal to that in the surge zone 40 or somewhat higher than that in the zone 40. However, if it is below the pressure in the surge zone 40, then a long enough seal leg must be provided in the conduit 29, so that it will force catalyst into the top of the reactor 10 by gravity feed principles, which are disclosed in detail in U. S. Patent No. 2,410,309. In the preferred form of this invention, the pressure in the hopper 27 is equal to or above that in the surge zone 40, in order that the conduit 29 may be as short as possible. If the pressure in the hopper 27 is above that in the top of the reactor 10, a smaller diameter conduit 29 can be used because more catalyst can be pushed through a pipe of given diameter if there is a pressure differential existing in the direction of flow of the solid particles. Thus, by this means it is possible to provide a smaller diameter seal leg in the conduit 29 than otherwise, thereby cutting down the loss of seal gas through the leg when the pressure in the pressure hopper 27 is released. After the bed in the hopper 27 has reached a level not very much below that shown in Figure 2, the three-way valve 31 is reversed allowing gas to escape through conduits 30 and 32 to the stack 35. When this is done, catalyst again feeds from the hopper 26 to the hopper 27. Under these conditions, the hopper 27 is at a much lower pressure than the surge zone or hopper 40, which is always maintained at an inert gaseous pressure slightly higher than that in the reaction zone 41. A differential pressure controller 42 has pressure connections 43, 44 attached to the surge and reaction zones and is operably connected to the valve 45 in the inert gas line 46. This apparatus is used to maintain the pressure differential between the zones at about ⅛–¼ p. s. i. So while hopper 27 is being filled with catalyst, the leg 29 serves as a seal in the same way in which leg 28 served as a seal while hopper 27 was emptying. In the system shown, the three-way valve 31 is operated by means of a motor-operated cycle timer. The size of the hopper 27 and the legs 28 and 29 feeding catalyst to the hopper 27 and from it are made such in relationship to the selected cycle time, which is controlled by the instrument 36, so that in the time allowed for maintaining hopper 27 under pressure, the catalyst level in hopper 27 will not fall below a predetermined level. Obviously, if the level of the bed in hopper 27 were permitted to fall too low into the conical portion thereof, the bed surface might be so low as to correspond to or be below the level at which the gas escaping from the chamber 40 into the hopper 27 would reach a catalyst boiling velocity. In this connection, it is important to distinguish between boiling velocity and terminal velocity. The terminal velocity is that upward gas velocity required to just lift the catalyst whereas the boiling velocity is considerably below that required to lift the particles. By way of definition, it is important in this invention that the catalyst in the seal leg and in the bed be maintained in compacted condition. This means that the catalyst particles rest upon each other and any catalyst particle is supported by catalyst particles therebelow and on either side thereof. It is not supported by flowing gas. In a boiling or fluidized bed, the catalyst particles are supported either entirely by the gas for very dilute suspensions or in part by the gas and in part by smaller catalyst particles which in turn are suspended by the gas. There is a very substantial difference in the amount of gas which will pass through a bed which is in compacted condition as opposed to the amount of gas which will pass through a bed which is boiling or is fluidized. Where catalyst is poured into a bin so that it forms a pile or bed therein in the absence of gas flow we have a compacted bed, provided the catalyst does not consist entirely of powdered material of fairly small size. It is true that some additional compacting might be obtained by jostling the bed or agitating it so as to make the particles fall into void spaces which can be provided in this manner. Also, it is true that there is a slight further compacting of the catalyst in the seal leg where pressure is applied against it. All of these conditions come within the definition of a compacted leg or bed. However, where due to gas flow therethrough a bed of granular material which has been formed by permitting a catalyst pile to accumulate on the bottom of a container begins to expand, the bed is no longer in compacted condition and the amount of gas which escapes through the bed rapidly increases. Moreover, particularly where granular particles are involved of palpable particulate form there is a tendency for gas to rat-hole or channel from the bed and to blow upwardly therethrough in spouts. All of this means that the seal which was maintained by the compacted bed is lost and in cases where the pressure differential is relatively greater, the catalyst itself may be carried in the expanding gas outwardly from the top of the container.

This invention applies to catalyst and solid material of palpable particulate form such as spheres, pellets, tablets, and particles of irregular shape as distinguished from fine powdered material. The invention, in general, does not apply to fine powdered material mainly because such material will not flow downwardly by gravity alone through a feed leg or drain conduit. The material tends to bridge and plug the leg. However, the invention applies to catalyst particles down to that size range where such bridging will occur. It is estimated that the invention will probably apply to particles having an average diameter as low as about 100 mesh Tyler and it applies to particles ranging upwardly in size to 3 mesh and even larger by Tyler standard screen analysis. This does not mean that in a stream of granular material there may not also be present a certain percentage of fines of smaller than 100 mesh size. In fact, the presence of a certain amount of such fines is desirable in that they tend to further decrease the amount of seal gas loss through the seal legs. The amount of such fines which may be tolerated depends, of course, on the size range of the larger material and upon the characteristics influencing the flowability of the material. For a spherical material, for example, of 4–10 mesh average particle diameter as much as 10 percent fines of smaller size ranging from 10 mesh to below 100 mesh size may be tolerated. In general, the amount of fines below 100 mesh which may be tolerated should not exceed about 3 percent and preferably not above 1 percent. However, it is conceived that even more fines may be tolerated in certain cases and the amount which may be tolerated can easily be determined for any given solid material involved by a determination of the amount of fines which may be tolerated in the material without interference with gravity flow through the seal leg when the catalyst is feeding the pressuring hopper or flowing from the pressuring hopper to the higher pressure reactor.

Referring now to Figure 3, that figure illustrates the fact that it is not necessary for the bottom of the vessels to be tapered in the broader forms of this invention. Also, Figure 3 shows a different type of control system. In this figure there are provided level measuring devices within the feed hopper 50 and the pressuring hopper 51. The devices shown are of the resistance type of device, such as shown in U. S. Patent No. 2,458,162. Thus, when the level reaches 1—1 in the pressuring tank 51, the level measuring device 52 actuates the instrument 53 to cause the motor 37 to change the three-way valve 31, so that a pressuring gas enters the pressuring tank 51. When the pressure in the tank reaches that at which catalyst can flow into the reactor, its flow will automatically occur and continue until the level reaches level 2—2. When level 2—2 is reached, the level indicating device there provided will actuate the instrument to again change the three-way valve so as to release the pressure in the pressuring tank whereby catalyst flow therefrom will automatically stop and catalyst will begin to fill the pressuring tank 51 from the feed hopper 50 thereabove. Solely as a safety device, there is provided a valve 55 which is maintained open in ordinary operation, but which will be closed automatically if the level in the feed hopper ever falls below 3—3 or if the level in the pressuring hopper ever falls below 4—4. It is assumed that if the level ever fell much below 3—3 in the feed hopper, or 4—4 in the pressuring hopper, the catalyst seal leg might be lost. Thus, in case of failure of the seal legs due to inadequate supply of catalyst or due to loss of the proper levels in the feed or pressuring hoppers, the reactor would be sealed off from these hoppers, thereby preventing escape of hydrocarbons to the atmosphere.

It will be noted that in Figure 2 the hopper 27 is on the emptying cycle whereas in Figure 3 the similar hopper 51 is being filled.

Turning to Figure 5, there is shown a somewhat modified arrangement adapted for a pneumatic lift type system. The pressuring hopper 60 is located in the upper portion of the reactor 10. The feed hopper 61 is located above the reactor and the hoppers are connected with seal conduits 62, 62. In this arrangement, the bottom portion of the feed hopper 61 and the entire length of the pressure hopper 60 is of annular cross-sectional shape, a shaft being provided for loose fit of the lift pipe 63 therethrough. Catalyst is withdrawn from the bottom of the feed hopper through a number of pipes 62 arranged in a ring around the bottom portion of the vessel and from the bottom of the pressuring hopper through pipes 65 similarly arranged in a ring around the lift pipe 63. Even for cylindrical type vessels or vessels of other shapes, it may be desirable to withdraw the catalyst through more than one seal leg, because this permits the overall height of bed required above the connection of the seal pipe to the conical part of the vessel to be reduced below that required if only one drain pipe is provided of very large diameter. It is to be noted in this figure that the surge hopper 64 above the reaction zone 66 is not separated from the pressuring hopper by a partition but that the solids drop directly from the bottom of the pressure hopper onto a bed of solids in the surge hopper 64. It is also important to note that in this arrangement funnels 67 are located just below the drain legs 62 and 65. The funnels 67 are open on their tops, but are placed in such a manner with respect to the lower ends of the drain legs that overflow of catalyst over the edges of the funnel is prevented. The manner of placing these funnels is disclosed in more detail in U. S. Patent No. 2,423,411. The spout from these funnels is of smaller diameter than the seal legs, so that the flow through the seal legs is maintained throughout the length in compacted condition; when pressure is attained in the hopper 60, a compact seal of catalyst will be maintained in the legs 62 from the lower end thereof on up. The small amount of catalyst in the funnel drains down into the hopper 60 when catalyst begins to flow therefrom to the hopper 64. However, if desired, the funnels may be kept full of catalyst by moving a baffle under them, as accomplished at the bottom of legs 65 by rotating baffles 70 into position. In that case, when pressure is relieved in hopper 60, not only will a compact leg of catalyst be maintained in legs 65, but also the funnels 67 at the bottom of these legs will be maintained full of catalyst. Figures 6 and 7 show the horizontal cross-section of the apparatus of Figure 5 on planes 6—6 and 7—7. It is important to note that the moving baffle or swinging plate 70 is well below the lower end of the spout of the funnels 77 and does not prevent gas flow. This type of apparatus can also be located at the base of seal legs 28 and 29 of Figures 2 and 3.

Figure 8 illustrates an arrangement involving two or more feeding systems. In this figure, a high-pressure kiln 75 is being supplied with catalyst and it is unnecessary to maintain the inert seal gas in the upper end of the kiln as was the case in the earlier drawings illustrating supply of catalyst into hydrocarbon reactors. The two three-way valves 31, 31' are operated by the motors 37, 37' and a suitable cycle timer 76, so that while one pressuring hopper 27 is being filled, the other is emptying whereby a constant bed level is maintained within the top of the kiln 75. In other words, there is a continuous rather than an intermittent supply of catalyst into the kiln. If desired, three or more sets of these feeding arrangements may be employed in proper cycle. As an added improvement and gas saving device at the point of change in the cycle, it may be desirable to equalize pressures between the hoppers prior to further reduction of the pressure on one and further increase of the pressure on the other. To effect this, there is provided a by-pass line 77. When, for example, it is desirable to pressure the left-hand hopper and depressure the right-hand hopper, the timer 77 opens the valve 78 permitting the pressure in the two vessels to equalize. Then valve 78 is closed and valve 31' is opened connecting the hopper 27' to the exhaust conduit 32, permitting reduction of pressure in the hopper 27' to atmospheric. Simultaneously with the opening of valve 31' to the exhaust conduit 32, valve 31 closes to the conduit 32 and opens pressure gas supply to the hopper 27, through the conduit 33, so that the pressure in hopper 27 is increased further until it reaches that in the kiln 75. By this procedure, the gas requirements are reduced by about one-half for the pressuring operation.

Figure 9 shows a similar system for supplying catalyst from a low-pressure reactor or kiln into a lift feed zone operated under a substantially higher pressure. This system operates in a manner similar to that described with reference to Figure 8. Air is introduced through conduit 80 to pass upwardly and downwardly through the catalyst bed and be removed through conduits 81, 82. The regenerated catalyst is removed through conduit 83 and legs 84, 85 to the pressuring tanks 86, 86'. The three-way valves 87, 87' are operated alternately to pressure and depressure the tanks 86, 86' and alternately feed catalyst through conduits 88, 88' to provide a continuous supply of catalyst to the lift tank 89, thereby maintaining a bed of catalyst in tank 89 about the lower end of the lift pipe 90. Lift gas is introduced into the catalyst bed in the vessel 89 through either or both conduits 91 and 92 to suspend and transfer the particles upwardly through the pipe 90.

Figure 10 shows a system for feeding catalyst from a low-pressure vessel or from a vessel operating under high-pressure into a catalyst lift pressuring drum which may attain a still higher pressure during a portion of the time. The vessel 100 may be a contacting vessel which contains a compacted bed of granular material. The bed is replenished from time to time by solids supplied through the conduit 101 attached to the top of the vessel. Gas is introduced through the conduit 102 to travel upwardly through the bed and is withdrawn through the conduit 103 in the upper portion of the vessel. The solids are withdrawn from the bottom of the vessel at periodic intervals through the conduit 104 to the pressuring pot 105 when the pressure in the pot is near or below the pressure in the vessel 100. The pressure in the pot 105 is raised intermittently to a pressure high enough to lift granular material in the form of a compacted column through the lift pipe 106. The three-way valve 110 is used to connect the high-pressure pipe 107 or the exhaust pipe 108 with the pipe 109, which communicates directly with the pot 105. The cross-section of the vessel 100 is of sufficient diameter so that gas flowing upwardly through the bed of solids is below the boiling velocity. The lower end of the conduit 104 is of restricted cross-section so as to maintain the solids in the conduit in compacted form. The pressure in the vessel 100 may be at about 10 p. s. i. (gauge) whereas the pressure in pot 105 may be alternated between atmospheric and 100 p. s. i. (gauge). When the pressure in the pot is high, the compacted leg in the lift pipe 106 moves upwardly overflowing into the receiving vessel 111. The solids are withdrawn by gravity through the drain leg 112. The gas may be withdrawn at about atmospheric pressure through the conduit 113 in the upper portion of the receiving vessel 111. The lift pipe is tapered outwardly so that the upward gas velocity at the upper end of the lift pipe is well below the bed disrupting or boiling velocity. Therefore, the particles do not rise in suspension in the gas but are lifted as a compacted column.

In Figure 11 there is shown a further improvement involving the use of concentric pipes in order to increase the surface area in the seal legs and the use of grating for the same purpose in the bottoms of the supply and pressuring hoppers. This improvement is the subject matter of a separate application, Serial Number 344,576, filed March 25, 1953. By increasing the amount of surface area in the leg or in the surge hopper or both, the amount of pressure differential which can be tolerated without loss of seal is very substantially increased, other things being equal. For example, pipes 120, 121 are located within pipe 28 and pipes 122, 123 are located within pipe 29. Rings 124, 125 and 126 are located in the bottom of the pipes to restrict the cross-section of the annular space between the pipes, so as to maintain the solids in this space in compacted condition. The subway grating 127 in the vessel 26, or 128 in the vessel 27 is similar to the separators used in egg crates. It divides the vessel cross-section into small squares, providing minimum resistance to downward flow of the solid material. Vertical baffles may be located laterally across the seal pipes instead of using concentric pipes, or other types of baffling may be used. It is only required that whatever baffling means is used decrease the hydraulic radius in the seal leg and in the bed thereabove without seriously interfering with the downward flow of catalyst. By providing more surface for the solids to contact, there is more fixed metal surface holding the solids in a fixed position, preventing leg blow-out. It is desirable to have the hydraulic radius in the leg less than 4 inches and preferably less than 2 inches. The hydraulic radius in the bed should be less than 2 and preferably less than 1 inch. The hydraulic radius is the cross-sectional area divided by the wetted perimeter generally. For a circular pipe, for example, $$R=\frac{D}{4} \text{ inches}$$

This invention finds application in situations where the pressure differential across the seal leg is at least 1 to 15 p. s. i. per foot of vertical seal leg length. The invention can be used where the pressure differential is lower, for example, upwards of about 0.5 p. s. i. per foot of leg. Generally, however, the invention is utilized where the pressure differential is at least 2½ p. s. i. per foot of leg. These numbers are given by way of example for systems using granular solids having a density within the range about 25–60 pounds per cubic foot.

EXAMPLE I

For an 8-inch diameter seal leg, 10 feet long and having a conical hopper on top thereof having a diameter at the bottom of the cone equal to 8" and a diameter 41½ inches above the bottom of the cone equal to 51 inches, the taper being uniform from bottom to top, using bead catalyst having density of 43 pounds per cubic foot, the following results were obtained:

| Maximum Pressure Differential at Blow-Out | Total Bed Height Above End of Seal Leg, Inches | Height of Bed Above Critical Level, Inches |
|---|---|---|
| 10 p. s. i. | 12 | 7.0 |
| 20 p. s. i. | 24 | 14.5 |
| 29 p. s. i. | 36 | 24.0 |

Air was used as the pressuring medium in this example.

EXAMPLE II

For the same apparatus discussed in Example I, the effect of partitions in the seal leg and grating in the hopper was tested with the following results:

| Conditions | Total Bed Height in Hopper, Inches | Bed Height Above Critical Level, Inches | Pressure Differential, p. s. i. |
|---|---|---|---|
| No partition or grating | 36 | 24 | 29 |
| Concentric 2" and 5" pipe in top 7½" of seal leg | 36 | 16.5 | 56 |
| 1 level of grating 33" above bottom of storage hopper | 36 | 10.5 | 125 |

The grating provided substantially equal vertical passages 1 inch by 4 inches in the horizontal plane and 1 inch in vertical dimension. Air was used as the pressuring medium.

EXAMPLE III

For the same apparatus a test was made with gratings at 3 levels, 15", 18" and 21" above the bottom of the hopper, but without partitions in the seal leg. This apparatus held a pressure differential of about 110 p. s. i. and only 2–4 inches of bed was required above the critical level in the hopper.

The amount of bed height required above the critical level has been found to vary somewhat with particle size. A smaller bed height above the critical is required with an increase in average particle diameter.

The use of gratings in the hopper has been found beneficial when located either above or below the critical level. The beneficial effect is less per unit of wetted surface area provided above the critical level for a single grating, but provides an improved result on a total basis because the total area across the hopper is greater above the critical level than below it. Usually one layer of grating takes most of the load if it is thick enough. For example, a thickness one and preferably two times the equivalent diameter of the opening in the grating should be provided. Additional layers of grating provide improved results, but not substantially better than those provided by a single layer. The equivalent diameter of the openings, or the least lateral dimension, should be at least five times the diameter of the particle for rectangular openings, and at least eight times the diameter for circular openings in the grating. This same relationship applies to a baffle system if this is used in place of a grating. Of course, the smaller the grating hydraulic radius the better will be the results with the above indicated lower limits. For granular catalyst of a size range about 4 to 10 mesh Tyler, usually used in catalytic cracking processes, the opening should be at least one inch in diameter and preferably about 2 inches in diameter. Openings in the hopper should not have a hydraulic radius greater than 16 inches broadly. It is preferred that the openings in the hopper have a hydraulic radius less than 2 inches.

For the partitions in the seal pipes, the minimum lateral dimension of the passages is not less than 8 particle diameters or approximately 1 inch and preferably not less than 2 inches. Preferably, the partitioning is such that the hydraulic radius is less than 2 inches. Broadly, the hydraulic radius in the seal leg should be less than 4 inches. In commercial units a grating hole of 1½" x 6" in lateral dimensions and 1" in height is satisfactory, for example. For such an installation, passages in the seal leg having a hydraulic radius of 2 inches is satisfactory. With respect to the partitions in the seal leg, they are needed only in the upper 1¼–3 diameters of the leg, because the leg will take up all the pressure differential push on the walls except that for the uppermost 1¼–3 diameters. When using partitions, the passages formed are preferably of the same hydraulic radius because otherwise the one having the greatest hydraulic radius will be the weakest link and will blow-out first, resulting in complete loss of the seal.

Figure 12 shows the effect of increasing the height of the bed of clay in the hopper above the seal leg for legs of various length. By increasing this height (up to a critical height) the seal leg may be used to seal a vessel at a higher pressure before blow-out occurs.

Figure 13 indicates the effect of enlarging the diameter of the clay hopper on the effectiveness of the seal for a seal leg of fixed length. It would appear that for a hopper of given diameter a critical value of height of clay in hopper is soon reached beyond which further increase in bed height yields little additional benefit. This is shown most clearly for the 2 inch diameter hopper.

Apparently, in the instant invention, the forces arising from the imposition of a gaseous pressure at the base of the seal leg are transmitted to the walls of the seal leg and also to the walls in the hopper thereabove. By increasing the amount of surface area available for given horizontal cross-sectional area for flow, i. e., by decreasing the hydraulic radius, will provide more surface area to absorb the upward force components and thereby within certain limits can further increase the amount of pressure differential which can be maintained across a seal leg of given height with a bed in the surge hopper of given height thereabove. While the provision of bed height above the stated critical minimums may further increase the allowable reduction of differential pressure, this further increase is of relatively small order. As for a cylinder 10 feet in diameter, the amount of force exerted on a given central area of the bed will increase with bed height only within certain limits. Thus, a bed 50 feet in height would create at its bottom 90 percent of the pressure which a bed of infinite height would exert and a bed 25 feet in height, that is two and one half times the vessel diameter would exert 70 percent of the total possible pressure from a bed of infinite height. In the broadest form of the invention there must be maintained above that level in the hopper where the gas velocity has been reduced to a point just below that which would boil the catalyst in the absence of further bed thereabove, a bed of at least as great and preferably of greater effective cross-sectional area having a height at least equal to 2 inches and preferably at least equal to 6 inches. As an example of what is meant by a gas velocity just below that which would boil the catalyst, such a velocity would be one which will give rise to a pressure drop per foot of bed 0.5" of water or less below that which would boil the catalyst. The upper end of the column formed in the seal leg must be expanded out and must be of such height so as to provide above that level in the hopper at which the gas velocity has been reduced to a value just slightly below that corresponding to the gas velocity required to boil catalyst at that level in the absence of bed thereabove, a further bed thereabove which gives rise to a calculated head substantially greater than a measured static pressure at that level.

In general, the seal legs should provide a passageway having a lateral dimension equal at least to five times the largest catalyst particle diameter and preferably about twenty times the largest catalyst particle diameter. In addition, it is required that the pipe be of sufficiently large diameter to permit passage therethrough in the cycle time allotted of the desired amount of catalyst. For a circular pipe this may be calculated from the formula $$V = 1.072 \times A(4R).5 \times \mu \times \log \frac{3.2R}{D}$$

where $\mu = .322$ for 4–10 mesh cracking beads, where V=C. F. M. of catalyst flow, A=orifice area in square inches, R=hydraulic radius, D=average particle diameter in inches. Where the pipe is split up by vertical baffles running transversely across the pipe, R is equal to the area divided by the wetted perimeter and the equivalent diameter is equal to $4 \times R$. Broadly, the area provided for catalyst flow in the seal device should provide a capacity for compact gravity flow of about 20 percent in excess of the expected maximum flow. The capacity may even be as high as twice the expected maximum flow. If the pressure in the vessel above the seal leg is higher than the pressure in the vessel below the leg, the amount of area provided for desired catalyst flow rate may be reduced somewhat. The above equation applies to pipes feeding from flat bottom vessels such as is shown in Figure 3 of the drawings. Where the portion of the vessel feeding the pipe is swaged, the equation for pipes in excess of 6 inches in diameter is $$V = 1.50 \times A(4R).5 \times \mu \times \log \frac{3.2R}{D}$$

$\mu$=co-efficient of internal friction (.322 for 4–10 mesh beads).

Where a single feed system is employed, the amount of seal pipe capacity required will be equal to the total catalyst circulation in the cyclic conversion system divided by the percentage of the time in which the catalyst flows through the seal pipe.

It will be noted from some of the drawings that it is not essential that the seal legs be vertical. They need only have a slope which will permit capacity flow of catalyst therethrough while keeping the pipe full of catalyst. This means that the slope should be greater than the angle of repose of the catalyst and, in general, greater than about 40 degrees with the horizontal.

If desired, as an added feature, but not as a required feature, swing valves may be provided below the seal leg which swing into place when it is desired to stop the catalyst flow and pressure the vessel in question. These valves swing out of place when it is desired to permit catalyst flow from the vessel. These valves are synchronized with the three-way valves pressuring and depressuring the pressuring hoppers. Thus, as is shown in Figure 5, when it is desired to feed catalyst from the hopper 60 into the hopper 64, the cycle timer turns the three-way valve 31 to permit pressuring hopper 60 and simultaneously causes the swing valve 70 to be pulled aside so that catalyst can drop into hopper 64, when the pressure in 64 reached the proper level. When it is desired to stop the flow from hopper 60 to hopper 64, the timer charges the valve 31 so that hopper 60 is depressured and simultaneously the swing valve 70 swings into place. In some cases, it might be desirable to swing the valve 70 into place just prior to releasing the pressure in hopper 60. This can all be done by proper timer control of the drive mechanisms. The swing valves are not essential, however, and in no case are they gas-tight valves. They do not involve the sliding of close-fitting metal surfaces together as in the case of ordinary valves. The valves serve merely to stop catalyst flow and are essentially a safety device and do not in any way serve to prevent catalyst from being blown out of the seal legs due to pressure differential thereacross.

It is believed that the required length of seal leg for a given pressure drop thereacross is a function of the hydraulic radius decreasing with decreasing hydraulic radius. Similarly, it is believed that the required amount of seal bed above the critical level in the surge hopper is a function of the hydraulic radius of the portion of the seal hopper therebelow and also decreases with decreasing hydraulic radius.

The invention finds application in the T. C. C. process wherein the reactor is operated at 15 p. s. i. and the kiln at atmospheric pressure. Another example is one wherein the reactor is operated at 50 p. s. i. and the kiln is operated at 10 p. s. i. for example. A further application of the invention is a reforming operation of the continuous moving bed type wherein the kiln is operated at about one p. s. i. and the reactor is operated at 175 p. s. i. Still another example is a lift system of the compact type wherein the lift feed zone may be pressured intermittently to pressures as high as 200 p. s. i., these zones being fed from a reactor or kiln operating under a substantially lower pressure. In some cases, such as the supply of catalyst into hydrocarbon conversion reactors, it is desirable to provide seal gases of inert make, such as steam, flue gas and nitrogen in the upper portion of the reactor above the catalyst conversion bed. Also, in such cases, it is usually desirable to employ an inert gas as a pressure gas in the pressuring tanks. In other cases, such as the supply of catalyst to a high-pressure regenerator, the use of air in the pressuring tanks may be satisfactory provided excessive burning does not occur. In such cases, it also may be desirable to use flue gas. However, in such cases the use of a sealing gas at the upper end of the kiln is not necessary. Similarly, in feeding grains to pressure hoppers or feeding low-pressure solid material, such as coal to blast furnaces, air may be employed as a pressuring medium in the pressure feed tanks. As stated above, the loss of seal gas may be reduced by permitting a certain concentration of fines to accumulate in the circulating solid stream. Usually, however, the loss of seal gas is maintained at a minimum by designing the seal pipe with a diameter as small as permitted by the other operating conditions involved. Other methods of decreasing the seal gas requirement are available and may be used if desired. Swing valves and check valves may be used in the seal legs, so that when the pressure differential across the leg is high the valves move to the closed position to limit the gas flow through the leg. It is desirable, when using these valves, that the valve not make a gas tight seal, in order to prevent crushing catalyst. The invention is not necessarily limited to cyclic systems wherein the particles are maintained in compact condition in the contacting zones. The upward gas velocity in these zones may, if desired, be high enough to disrupt or even boil the bed and provided the solids are large enough to flow in compacted form through the seal legs, the invention will be operable.

With respect to cycle time, a suitable cycle will take 30 seconds to fill, 15 seconds to depressure, 30 seconds to empty, and 15 seconds to pressure the pressure pot when using such a system for feeding a T. C. C. reactor.

In systems such as the T. C. R. system, continuous reforming system for upgrading gasoline, where the catalyst circulation may be of the order of 1/10 of that involved in a T. C. C. system of comparable capacity, it will be desirable to employ longer cycles, for example 1–2 minutes to fill and 1–2 minutes to empty the pressuring tank.

EXAMPLE IV

In a laboratory model of the type shown in Figure 3 in which the seal tube was four-tenths of an inch in diameter and the supply hopper of three inch diameter, with 30–60 mesh clay having a pour density of 35 pounds per cubic foot:

| Length of Seal Tube, inches | Height of Clay in Hopper, inches | Blow-Out Pressure, p. s. i. |
|---|---|---|
| 4 | 2½ | 1½ |
| 8 | 2½ | 4 |
| 12 | 2½ | 8 |

Air was used as the pressuring medium.

EXAMPLE V

In an arrangement similar to that shown in Figure 4 wherein the diameter of the seal pipe is 8″ iron pipe size and the length of the seal pipe was 5 feet of the total height, and the conical hopper was 54 inches with a diameter at its upper end of 64 inches, and with bead catalyst having a loose density of 43 pounds per cubic foot:

| Bed Height in Funnel (H) | 1′ | 2′ | 3′ | 4′ |
|---|---|---|---|---|
| Blow-Out Pressure, p. s. i. at lower end of Seal Leg | 7½ | 17½ | 26 | 35 |
| Pressure at upper end of Seal Leg (Base of Conical Hopper) | 0 | 1½ | 3½ | 5½ |

*Catalyst bed dimensions*

| h in Feet | d in Feet |
|---|---|
| 0 | .7 |
| 1 | 1.7 |
| 2 | 2.8 |
| 3 | 3.8 |
| 4 | 4.8 |
| 4½ | 5.3 |

EXAMPLE VI

This arrangement was similar to that shown in Figure 11 except that the feed hopper was conical throughout its height and did not contain the subway grating. The feed hopper was the same as employed in Example V. The feed leg was comprised of long concentric 8″, 5″ and 2″ diameter pipes arranged on a common vertical axis and having a total length of 5 feet. This increased the wall area in the seal leg from about 10½ square feet in Example V to about 30 square feet in the present example. The following data were obtained:

| Bed Height in Funnel (H) | 1′ | 2′ | 3′ | 4′ |
|---|---|---|---|---|
| Blow-Out Pressure, p. s. i. at lower end of Seal Leg | 17 | 24 | 37 | 60 |
| Pressure at upper end of Seal Leg (Base of Conical Hopper) | 0 | 3 | 6 | 9½ |

EXAMPLE VII

For a set-up similar to that discussed in Example VI except that the seal leg length is 10 feet and except that subway grating was added to the lower portion of the hopper as shown in Figure 11. The blow-out pressure was about 170 p. s. i. for a three-foot bed in the hopper. Three layers of grating were used at 3″, 6″, and 9″ levels above the bottom of the hopper. The grating dimensions were 1″ x 4″ and the gratings were all 1″ high.

All kinds of gases can be used as the pressuring medium in this invention. However, the invention can also be practiced by using a liquid as the pressuring medium instead of a gas. The term fluid is, therefore, used for the pressuring medium and refers to any liquid or gas which may be employed without damage to catalyst or fluid when the two are brought into contact with each other. For example, in various instances steam, flue gas, air, water, naphtha, or kerosene may be used as well as other suitable liquids or gases.

Referring now to Figure 14, the invention is shown as applied to a system for deasphalting crude residuum with absorbing solids. Crude residuum and catalyst are charged concurrently to the top of the absorbing vessel 131 through the funnel 132 and connecting pipe 133. The absorbing vessel is maintained at low pressure. The saturated beads of catalyst are passed alternately through the conduits 134 and 135 into the pressuring tanks 136 and 137 and from there alternately through the conduits 138 and 139 to the container 140 at the bottom of the lift pipe 141. The beads while passing through this system are placed under advanced pressure and sluiced upwardly through the lift pipe 141 to the continuous filter 142. The lifting fluid is drained from the beads while they are passed horizontally across the filter belt 143 of the filter 142. The drained beads are dropped from the end of the belt into the hopper 144 and gravitated in substantially compact columnar form through the conduit 145 to a catalytic cracking reactor not shown. A wash oil which may be synthetic tower bottoms, or other like petroleum stock, is sprayed onto the beads on the filter belt 143 through the conduit 146. The liquid which drains from the filter belt is caught in the funnels 147 and 148. A portion of this liquid, therefore, drains through the conduits 149 and is placed under pressure by means of pump 150. This liquid under pressure is introduced alternately into the pressure pot 137 and the pressure pot 136 to bring the pressure in these pots up to the pressure in the container 140 at the lower end of the lift pipe 141, to thereby permit feeding of the contact material downwardly from the pressure pots to the container 140. Alternately, liquid is withdrawn from the pressure pots 136 and 137 through the conduits 151 and 152 to relieve the pressure in these pots and permit feeding of contact material from the low pressure absorber 131 to replenish the supply of contact material in the pressure pots. Some of this withdrawn liquid may be introduced into the bottom of the absorber through the conduit 153 to serve as absorbent in the vessel 131 and the excess may be withdrawn through the conduit 154 and combined with the effluent from the absorber, which is the combined wash oil and asphalt. A second portion of the wash oil is passed downwardly through the conduit 155 and placed under pressure by means of the pump 156. This stream of wash oil is then introduced into the lower end of the lift pipe 141 to aid in sluicing the contact material upwardly through the lift pipe. It is seen that this design permits the wash oil to be used to wash the contact material in several wash stages and also to be used as a pressuring medium in the pressure pots of the valveless feeder used to place the contact material under pressure and also to be used as a sluicing medium for transporting the contact material upwardly through the elongated lift pipe 141 to a level above the catalytic cracking reactor, not shown on Figure 14.

Referring now to Figure 15, there is shown a continuous adsorption process for the separation of aromatics from non-aromatics which incorporates the valveless feeder with liquid used as a pressuring medium. A suitable solid adsorption agent, such as silica gel, is used in this process. For illustrative purposes, a mixture of toluene and non-aromatics boiling in the same boiling range as toluene, such that separation of the two can not be accomplished easily by normal distillation procedures, is charged through the conduit 160 to the vessel 161 under the desired operating pressure, and in which the adsorbent is flowing downwardly as a compact gravitating bed. The adsorbent, saturated with xylene and containing xylene in the interstices is charged at the top of the adsorption column 161 from the valveless pressure lock system located thereabove. As the adsorbent descends in the column, the toluene present in the charge replaces the xylene previously adsorbed and the toluene is retained in the adsorbent. Near the bottom of the column, liquid butane is charged and flows upwardly countercurrent to the flow of adsorbent to wash out any non-aromatic portion from the feed in the void spaces of the catalyst bed. Therefore, butane, non-aromatics and xylene are withdrawn from the top of the column through the conduit 162, and these can be easily separated by normal distillation procedures. There is shown two fractionating columns 163 and 164 connected in series for accomplishing this separation with suitable connecting conduits. The difference in pressure between the top of the lift pipe 165 and the bottom of the adsorption column is sufficient to cause the adsorbent to be sluiced up the lift pipes 165 and delivered at low pressure into the hopper 166. Xylene contained in the vessel 167 is drawn through the conduit 168 placed under pressure by means of the pump 169. A portion of this xylene is introduced into the bottom of the lift pipe 165 through the conduit 170 to serve as the basic lift medium. During the lifting step, toluene is de-adsorbed from the adsorber and xylene is re-adsorbed. Some butane may also enter in which case it is separated from the toluene mixtures by distillation. Two distillation columns 171 and 172 are shown connected in series for the separation of xylene, toluene and butane removed from the top of the hopper 166 through the conduit 173. A second portion of xylene under pressure is passed through the conduit 174 and used as a pressuring medium to alternately place the pressure pots 175 and 176 under pressure substantially that of the adsorption column 161 so that the adsorbent under pressure can feed from the pressure pots 175 and 176 down to the top of the gravitating column of adsorbent in the adsorption column 161. Alternately, the pressure in the pressure pots 175 and 176 is relieved by withdrawing liquid from these pots through conduits 177 and 178 and this liquid is passed through the conduit 179 to be combined with the effluent from the vessel 161 passing through the conduit 162 to the fractionation columns 163 and 164. A portion of the liquid in the pressure pots 175 and 176 will, of course, pass upwardly through the conduits 180 and 181 and be withdrawn from the hopper 166 through the conduit 173. Another portion of the xylene under pressure is passed through the conduit 182 and introduced to the top of the column 161. A small amount of this liquid will pass upwardly through the conduits 183 and 184. By the procedure above described, the valveless pressure lock system is used to feed adsorbent into an adsorption column maintained under pressure so that a volatile liquid can be maintained in the liquid form and also so that the liquid under pressure may be used to sluice the solid material upwardly through a lift leg to transfer the solid material through an enclosed path. It is seen that liquid is used as a pressuring medium in this process in a manner similar to that of the gas in the previously described embodiments of the invention.

EXAMPLE VIII

The sealing capacity of silica-alumina beads of 0.041" diameter and density of .70 gram/cc. was tested with water as the pressuring medium. The apparatus comprised a vertical glass tube of about ½" inside diameter and 18" long with a conical funnel 3½" tall, located at the upper end of the glass tube. The funnel had an apex angle of 60 degrees. The lower end of the glass tube was attached to a chamber and pressuring apparatus was fastened to the chamber. The following results were obtained:

WITH WATER AS PRESSURING MEDIUM

| Length of Seal Leg | Blow-Out Pressure in Inches of Mercury |
|---|---|
| Seal leg extending up to top of glass tube | 2.13 |
| Seal leg extending 1″ into hopper | 4.64 |
| Seal leg extending 2″ into hopper | 9.64 |
| Seal leg extending 3″ into hopper | 13.58 |

WITH AIR AS PRESSURING MEDIUM

| Length of Seal Leg | Blow-Out Pressure in Inches of Mercury |
|---|---|
| Seal leg extending up to top of glass tube | 1.20 |
| Seal leg extending 1″ into hopper | 4.30 |
| Seal leg extending 2″ into hopper | 11.80 |
| Seal leg extending 3″ into hopper | 20.40 |

*Note.*—When using air as the pressuring medium, the seal gas was allowed to escape into the atmosphere from the top of the funnel. When using water as the pressuring medium, the water was allowed to flow over the upper end of the funnel.

This application is a continuation-in-part of my prior application Serial No. 327,561, filed December 23, 1952, now abandoned.

It should be understood that this invention covers all modifications and changes of the examples herein chosen to illustrate the invention for purposes of disclosure, which do not constitute departures from the spirit and scope of the invention.

I claim:

1. In a process for transferring solid material of palpable particulate form from one location to another, the method comprising: passing the solid material downwardly from a first region through a confined passage as a compact gravitating column of particles into a confined zone therebelow, periodically removing the solid material from said confined zone and simultaneously preventing the flow of solid material in said confined passage by increasing the fluid pressure in said confined zone to a pressure which is above that in said first region by an amount in excess of the value obtained by dividing the weight of the solid material in said passage by the average horizontal cross-sectional area thereof and preventing disruption of the compactness of the column and upward discharge of the solid material from said passage by maintaining on top of said column a compact bed of said solid material of substantially greater horizontal cross-sectional area than said column in which the fluid escaping from said column decelerates, said bed being of sufficient horizontal cross-sectional area and vertical depth to effect deceleration of the fluid to a linear velocity below that which would disrupt the compactness of said bed substantially before it reaches the surface of said bed.

2. In a process for transferring solid material of palpable particulate form from one location to another, the method comprising: passing the solid material downwardly from a first region through a confined passage as a compact gravitating column of particles into a confined zone therebelow, periodically removing the solid material from said confined zone and simultaneously preventing the flow of solid material in said confined passage by increasing the fluid pressure in said confined zone to a pressure which is above that in said first region by an amount sufficient to force the solid material to move upwardly through and out of the upper end of the passage and preventing disruption of the compactness of the column and upward discharges of the solid material from said passage by maintaining on top of said column a compact expanded bed of said solid material of such horizontal and vertical dimensions as to cause fluid from the non-expanded portion of the seal column to be decelerated to a velocity slightly below the bed disrupting velocity at a level spaced a substantial distance below the bed surface, the length of the bed above that level being sufficient to overcome the upward thrust of the solid particles below said level.

3. In a process for transferring solid material of palpable particulate form from one location to another, the method comprising: passing the solid material downwardly from a first region through a confined passage as a compact gravitating column of particles into a confined zone therebelow, restricting the flow from said column sufficiently to prevent free-fall of solid particles in said column, periodically removing the solid material from said confined zone and simultaneously preventing the flow of solid material in said confined passage by increasing the gaseous pressure in said confined zone to provide a pressure differential across the confined passage in excess of about 0.5 p. s. i./ft. of vertical column height and preventing disruption of the compactness of the column and upward discharge of the solid material from said passage by maintaining on top of said column a compact laterally-expanded bed of said solid material of such horizontal and vertical dimensions as to cause gas from the non-expanded portion of the seal column to be decelerated to a velocity slightly below the bed disrupting velocity at a level spaced a substantial distance below the bed surface, that portion of the bed above said level being of greater horizontal cross-sectional area than the bed at that level and of sufficient length to overcome the upward thrust of the solid particles below said level.

4. In a process for transferring solid material of palpable particulate form from one location to another, the method comprising: passing the solid material downwardly from a first region through a confined passage as a compact gravitating column of particles into a confined zone therebelow, restricting the flow from the lower end of said column sufficiently to prevent free-fall of solid particles in said passage, periodically removing the solid material from said confined zone through an upwardly-directed lift passage by increasing the gaseous pressure in said zone to a level which provides a pressure differential across the confined passage in excess of about 0.5 p. s. i./ft. of vertical column height and preventing the flow of solid material in said confined passage, disruption of the compactness of the column and upward discharge of the solid material from said passage by maintaining on top of said column a compact laterally-expanded bed of said solid material of such horizontal and vertical dimensions as to cause gas from the non-expanded portion of the seal column to be decelerated to a velocity slightly below the bed disrupting velocity at a level spaced a substantial distance below the bed surface, that portion of the bed above said level being of greater horizontal cross-sectional area than the bed at that level and of sufficient length to overcome the upward thrust of the solid particles below said level.

5. In a process for transferring solid material of palpable particulate form from one location to another the method comprising: passing the solid material downwardly from a first region through a first confined passage as a compact gravitating column of particles into a confined pressuring zone therebelow, restricting the flow from the lower end of said column sufficiently to prevent free-fall of solid particles in said passage, periodically increasing the gaseous pressure in said confined pressuring zone to a pressure near that in a receiving zone located below said pressuring zone, so as to permit solid material to flow by gravity from said pressuring zone through a second confined passage to said receiving zone, the gaseous pressure in said pressuring zone being sufficient to provide a pressure differential across the first confined passage in excess of about 0.5 p. s. i./ft. of vertical column height, and preventing the flow of solid material, disruption of the compactness of the column and upward discharge of the solid material from said first confined passage by maintaining on top of said column a compact laterally-expanded bed of said solid material of such horizontal and vertical dimensions as to cause gas from the non-expanded portion of the seal column to be decelerated to a velocity slightly below the bed disrupting velocity at a level spaced a substantial distance below the bed surface, the height of the bed above that level being sufficient to overcome the upward thrust of the solid particles below said level.

6. A method for supplying solid material of palpable particulate form from a first zone to a zone of substantially higher pressure located below said first zone a vertical distance substantially less than that corresponding to a column of said solids of sufficient length to permit gravity flow of the solids into said lower zone which method comprises: flowing the solid material downwardly from said first zone through a passage as a confined compact stream and discharging it downwardly into a confined pressuring zone located elevationally between said first and second zones and existing under a pressure substantially below that in said second zone and sufficiently low to permit gravity flow of the solids thereinto from said first zone, periodically increasing the fluid pressure in said pressuring zone to a level near that in said second zone and sufficiently high to permit flow of the solids from said pressuring zone downwardly through a second passage as a compact stream of less horizontal cross-section than said pressuring zone into said second zone, while, without obstructing said first passage, maintaining the same filled substantially throughout its length with a compact column of said solids and withdrawing fluid escaping upwardly from said column through a compact bed of said solids maintained in the first zone on top of said column, said bed being of substantially greater horizontal cross-sectional area than said column.

7. A method for supplying solid material of palpable particulate form from a first zone to a second zone of substantially higher pressure located below said first zone a vertical distance substantially less than that corresponding to a column of said solids of sufficient length to permit gravity flow of the solids into said lower zone which method comprises: flowing the solid material downwardly from said first zone through a first passage as a confined compact stream and discharging it downwardly into a confined pressuring zone located elevationally between said first and second zones and existing under a pressure substantially below that in said second zone and sufficiently low to permit gravity flow of the solids thereinto from said first zone, periodically increasing the gaseous pressure in said pressuring zone to a level near that in said second zone and sufficiently high to permit flow of the solids from said pressuring zone downwardly through a second passage as a compact stream of less horizontal cross-section than said pressuring zone into said second zone, while, without obstructing said first passage, maintaining the same filled substantially throughout its length with a compact column of said solids and withdrawing fluid escaping upwardly from said column through a compact bed of said solids maintained in the first zone on top of said column, said bed being of substantially greater horizontal cross-sectional area than said column, reducing the fluid pressure in said pressuring zone periodically to prevent said pressuring zone from emptying of solid material and replenish said solid material supply from said first zone, while, without obstructing said second passage, maintaining the same filled substantially throughout its length with a compact column of said solids and withdrawing fluid escaping upwardly from said column through a compact bed of said solids maintained in the pressuring zone on top of said column, said bed being of substantially greater horizontal cross-sectional area than said column.

8. In a process for transferring solid material of palpable particulate form from one location to another, the method comprising: passing the solid material downwardly from a first region through a confined passage as a compact gravitating column of particles into a confined zone therebelow, periodically removing the solid material from said confined zone and simultaneously preventing the flow of solid material in said confined passage by increasing the fluid pressure in said confined zone to a pressure which is above that in said first region by an amount in excess of the value obtained by dividing the weight of the solid material in said passage by the average horizontal cross-sectional area thereof and preventing disruption of the compactness of the column and upward discharge of the solid material from said passage by maintaining on top of said column a compact bed of said solid material of substantially greater horizontal cross-sectional area than said column in which the fluid escaping from said column decelerates, said bed being of sufficient horizontal cross-sectional area and vertical depth to effect deceleration of the fluid to a linear velocity below that which would disrupt the compactness of said bed substantially before it reaches the surface of said bed and said bed resting on said column without the interpositioning of any obstructions therebetween.

9. In a process for transferring solid material of palpable particulate form from one location to another, the method comprising: passing the solid material downwardly from a first region through a confined passage as a compact gravitating column of particles into a confined zone therebelow, the length of said passage being at least twice the diameter thereof, periodically removing the solid material from said confined zone and simultaneously preventing the flow of solid material in said confined passage by increasing the gaseous pressure in said confined zone to provide a pressure differential across the confined passage sufficient to force an amount of gas upward through the leg which would disrupt the compactness thereof in the absence of an expanded portion at the top thereof, and expanding the upper portion of the leg over a sufficient length so that the expanded portion remains compact and prevents disruption of the compactness of the bed.

10. The method of feeding catalyst to a hydrocarbon conversion zone from a supply zone under substantially lower pressure than the hydrocarbon conversion zone and located above the conversion zone a distance substantially less than that corresponding to a column of said catalyst of sufficient length to permit gravity flow of the catalyst into said conversion zone which method comprises: flowing the catalyst downwardly from said supply zone through a first passage of substantially smaller cross-section than said supply zone as a confined compact stream and discharging it downwardly into a confined pressuring zone located elevationally between said supply and conversion zones and existing under a pressure substantially below that in said conversion zone and sufficiently low to permit gravity flow of the catalyst thereinto from said supply zone, throttling the flow of catalyst at the lower end of said first passage an amount sufficient to maintain the catalyst in the passage in substantially compact form throughout the length of the passage, supplying catalyst to the supply zone periodically, increasing the gaseous pressure in said pressuring zone to a level near that in said conversion zone and sufficiently high to permit flow of catalyst from said pressuring zone downwardly through a second passage of substantially smaller cross-section than said pressuring zone as a compact stream into a surge zone located above and communicating with the conversion zone by supplying an inert gas under pressure to said pressuring zone, while, without obstructing said first passage, maintaining the same filled substantially throughout its length with a compact column of catalyst and withdrawing gas escaping upwardly from said column through a compact bed of said solids maintained in the supply zone on top of said column, maintaining the bed in said supply zone at all times at least of such vertical and horizontal dimensions as to cause gas from the seal leg to be decelerated to a velocity slightly below the bed disrupting velocity at a level spaced a substantial distance below the bed surface, the length of the bed above that level being sufficient to overcome the upward thrust of the solid particles below said level, throttling the flow of catalyst at the lower end of said second passage an amount sufficient to maintain the catalyst in the passage in substantially compact form throughout the length of the passage, reducing the gaseous pressure in said pressuring zone periodically to prevent said pressuring zone from emptying of catalyst and to replenish said catalyst supply from said supply zone, while, without obstructing said second passage, maintaining the same filled substantially throughout its length with a compact column of said solids and introducing inert gas into said surge zone at a pressure higher than maintained in said conversion zone to pass upwardly through said confined column and the compact bed of said solids maintained in the pressuring zone on top of said column, maintaining the bed in said pressuring zone at all times at least of such vertical and horizontal dimensions as to cause gas from the seal leg to be decelerated to a velocity slightly below the bed disrupting velocity at a level spaced a substantial distance below the bed surface, the length of the bed above that level being sufficient to overcome the upward thrust of the solid particles below said level.

11. The method of claim 10 further characterized in that the catalyst is discharged from said first and second passages onto accumulations of said catalyst in said pressuring zone and in said surge zone, said accumulations serving to throttle the flow of catalyst from said passages and having at their broadest point a cross-sectional area substantially less than that of said pressuring and surge zones and greater than that of the passages, withdrawing at least one stream of catalyst, symmetrically located with respect to said passage, from each accumulation, controlling the rate of catalyst flow in said stream substantially below the possible rate of supply of catalyst from the passage thereabove, while freely exposing the surface of said accumulation and the withdrawal stream therefrom to the gaseous pressure within the pressuring and surge zones respectively, whereby the streams of catalyst in said first and second passages are maintained in substantially compact form throughout the length of said passages.

12. The method of claim 10 further characterized in that the cross-section of the first and second passages is gradually reduced from top to bottom an amount sufficient to maintain the catalyst in substantially compact form and further that these passages are so tapered that the upward gas velocity is maintained substantially constant from the bottom of each passage to the top thereof.

13. In a process for transferring solid material of palpable form from one location to another, the method comprising: passing the solid material downwardly from a first region through a confined passage as a compact gravitating column of particles into a confined zone therebelow, restricting the flow of solid material adjacent the lower end of said column sufficiently to cause said column to flow in compacted form throughout the length of the column, periodically removing the solid material from said confined zone and simultaneously preventing the flow of solid material in said confined passage by increasing the gaseous pressure in said confined zone to provide a pressure differential across the confined passage in the range of about 1–5 p. s. i. per foot of column length, and preventing the disruption of the compactness of the column and upward discharge of the solid material from said passage by maintaining on top of said column a compact, laterally-expanded bed of said solid material having a ratio of $$\frac{\text{Diameter of bed (at widest dimension)}}{\text{Diameter of column}} = \text{about 3-10}$$

References Cited in the file of this patent

UNITED STATES PATENTS

| | | |
|---|---|---|
| 2,274,003 | Sheppard | Feb. 24, 1942 |
| 2,303,717 | Arveson | Dec. 1, 1942 |
| 2,410,309 | Simpson et al. | Oct. 29, 1946 |
| 2,626,235 | Wilson | Jan. 20, 1953 |
| 2,676,142 | Crowley | Apr. 20, 1954 |
| 2,684,873 | Berg | July 27, 1954 |
| 2,722,475 | Yurko | Nov. 1, 1955 |